United States Patent
Fielding et al.

(10) Patent No.: US 10,542,167 B2
(45) Date of Patent: Jan. 21, 2020

(54) SYSTEMS AND METHODS RELATING TO DOCUMENT AND FASTENER IDENTIFICATION

(71) Applicant: Ripcord Inc., Hayward, CA (US)

(72) Inventors: Alex Fielding, Hayward, CA (US); Kevin Christopher Hall, Hayward, CA (US); Kirk H. Knight, Hayward, CA (US); Jens Jordan Hurley, Hayward, CA (US); Jonathan Floyd Grubb, Hayward, CA (US); Joseph David Dills Hartnagle, Hayward, CA (US)

(73) Assignee: RIPCORD INC., Hayward, CA (US)

( * ) Notice: Subject to any disclaimer, the term of this patent is extended or adjusted under 35 U.S.C. 154(b) by 0 days.

(21) Appl. No.: 16/007,069

(22) Filed: Jun. 13, 2018

(65) Prior Publication Data
US 2018/0295248 A1 Oct. 11, 2018

Related U.S. Application Data

(63) Continuation of application No. PCT/US2016/067583, filed on Dec. 19, 2016.
(Continued)

(51) Int. Cl.
*H04N 1/00* (2006.01)
*G03G 15/00* (2006.01)
(Continued)

(52) U.S. Cl.
CPC ......... *H04N 1/00755* (2013.01); *G03B 15/03* (2013.01); *G03B 15/07* (2013.01);
(Continued)

(58) Field of Classification Search
None
See application file for complete search history.

(56) References Cited

U.S. PATENT DOCUMENTS

| 5,087,027 A | 2/1992 | Acquaviva |
| 6,074,334 A | 6/2000 | Mennie et al. |

(Continued)

FOREIGN PATENT DOCUMENTS

| CN | 201741888 U | 2/2011 |
| CN | 103685840 A | 3/2014 |

(Continued)

OTHER PUBLICATIONS

International Search Report and Written Opinion dated May 22, 2017 for International PCT Patent Application No. PCT/US2016/067583.

(Continued)

*Primary Examiner* — Lennin R Rodriguezgonazalez
(74) *Attorney, Agent, or Firm* — Wilson, Sonsini, Goodrich & Rosati

(57) ABSTRACT

Method and systems of automated document processing described herein include activating in sequence a plurality of illumination modules of an illumination source to illuminate a document, where the plurality of illumination modules are located at different positions relative to the document. The document can be imaged each time the document is illuminated by an illumination module to provide a plurality of images. A shadow profile of the document can be obtained based on the plurality of images. One or more of a boundary of the document and presence of a fastener attached to the document can be identified using the shadow profile. Any fasteners present may be removed using a robot arm.

6 Claims, 14 Drawing Sheets

Related U.S. Application Data

(60) Provisional application No. 62/233,934, filed on Dec. 19, 2015, provisional application No. 62/233,947, filed on Dec. 19, 2015, provisional application No. 62/233,938, filed on Dec. 19, 2015.

(51) Int. Cl.
*G03B 15/03* (2006.01)
*G03B 15/07* (2006.01)
*G07D 7/189* (2016.01)
*H04N 1/12* (2006.01)

(52) U.S. Cl.
CPC ........... *G03G 15/607* (2013.01); *G07D 7/189* (2017.05); *H04N 1/00588* (2013.01); *H04N 1/00607* (2013.01); *H04N 1/125* (2013.01); *G03G 2215/00308* (2013.01)

(56) References Cited

U.S. PATENT DOCUMENTS

| | | |
|---|---|---|
| 2003/0168308 A1 | 9/2003 | Maier et al. |
| 2004/0022563 A1 | 2/2004 | Maruchi et al. |
| 2005/0087422 A1 | 4/2005 | Maier et al. |
| 2007/0091371 A1 | 4/2007 | Sugihara |
| 2010/0067071 A1 | 3/2010 | Rozenfeld et al. |
| 2011/0290851 A1 | 12/2011 | Shelton, I |
| 2014/0341438 A1 | 11/2014 | Parkov et al. |

FOREIGN PATENT DOCUMENTS

| | | |
|---|---|---|
| EP | 0731596 A1 | 9/1996 |
| WO | WO-2017106856 A1 | 6/2017 |

OTHER PUBLICATIONS

EP16876924.8 The Extended European Search Report dated Jul. 22, 2019.

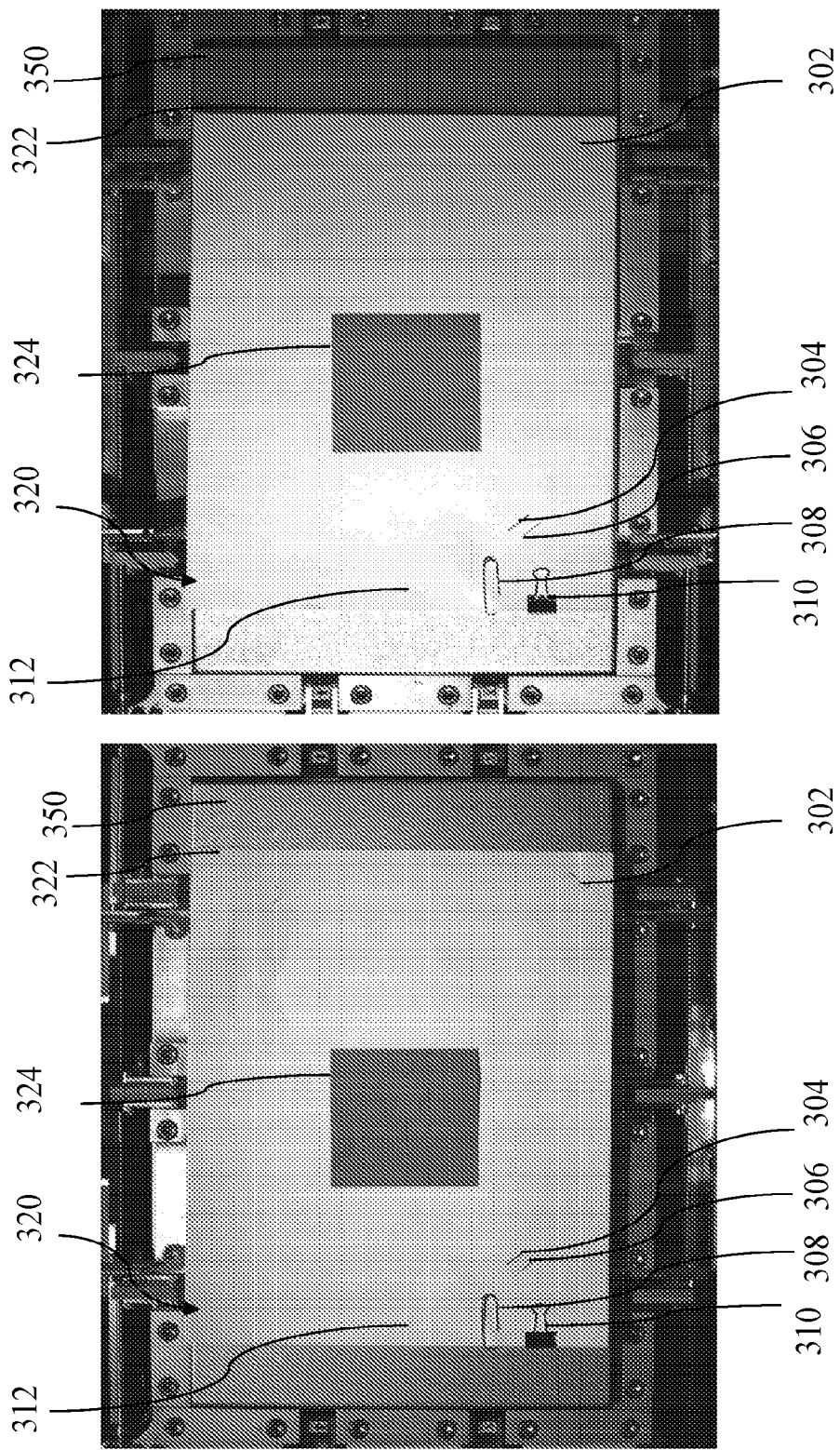

SYSTEMS AND METHODS RELATING TO DOCUMENT AND FASTENER IDENTIFICATION

CROSS REFERENCE

This application is a continuation of international application no. PCT/US2016/67583, filed Dec. 19, 2016, which claims the benefit of U.S. Provisional Application No. 62/233,934, filed Dec. 19, 2015, entitled "Method and Apparatus Utilizing Computer Vision System to Identify Document Fasteners", U.S. Provisional Application No. 62/233,938, filed Dec. 19, 2015, entitled "Methods and Apparatus Utilizing Robotic Automation to Remove Document Fasteners", and U.S. Provisional Application No. 62/233,947, filed Dec. 19, 2015, entitled "Multi-function Robotic Apparatus for Document Preparation and Imaging", each of which is hereby incorporated herein by reference in its entirety.

BACKGROUND

Information can often be stored on physical document files. Such physical document files may be packed away in archives, warehouses and/or vaults. Access of information stored on physical document files may be costly and time consuming. Physical documents may be disorganized. Often the documents may include one or more fasteners attached thereto. Not only can the physical documents be difficult to locate and transport, but once the physical documents have been identified, extracting the information from the physical files can also be time consuming as well.

SUMMARY

According to some aspects, a method of document processing can comprise activating, in sequence, a plurality of illumination modules of an illumination source to illuminate a document, wherein the plurality of illumination modules are located at different positions relative to the document; imaging the document each time the document is illuminated by an illumination module of the plurality of illumination modules, to provide a plurality of images; obtaining a shadow profile of the document based on the plurality of images; and identifying, with aid of at least one processor, at least one of a boundary of the document and presence of a fastener attached to the document using the shadow profile.

In some embodiments, identifying the boundary of the document comprises identifying an edge having a thickness of less than 0.1 mm. In some embodiments, identifying the presence of the fastener comprises recognizing when the fastener is an inverted fastener.

In some embodiments, the method includes, when the fastener is the inverted fastener: applying a suction force upon a portion of the document using a suction applicator to lift the document from a document pedestal; positioning a first document platform under the lifted document; positioning a second document platform over the lifted document to place the document between and in contact with the first document platform and the second document platform; and rotating the first document platform and the second document platform around a horizontal axis to flip the document over.

In some embodiments, removing the identified fastener comprises: coupling a document transfer end effector to the robot arm; contacting a top surface of the document with the document transfer end effector coupled to the robot arm to apply a suction force upon the document to lift the document from a document pedestal on which the document is positioned to separate the document from other documents on the document pedestal; rotating a document pincher of the document transfer end effector to contact a bottom surface of the document to secure the document against the document transfer end effector; positioning a document platform under the lifted document to maintain separation of the document from the other documents; releasing the suction force applied upon the document by the document transfer end effector to place the document on the document platform; and releasing the document transfer end effector from the robot arm and coupling a fastener removal end effector to the robot arm.

In some embodiments, the method includes: contacting a top surface of the document with a document contacting portion of the fastener removal end effector to hold the document against the document platform; inserting a fastener removal tab of the fastener removal end effector between the fastener and the top surface of the document; gripping the fastener with a fastener gripper of the fastener removal end effector to position at least a portion of the fastener between the fastener insert tab and the fastener gripper; and moving the fastener gripper and the fastener removal tab away from the document to remove the fastener.

In some embodiments, the document further comprises a staple attached thereto, and wherein identifying the at least one of the boundary of the document and presence of a fastener comprises identifying presence of the staple.

In some embodiments, the method includes identifying a corresponding fastener removal end effector for a robot arm based on type information of the fastener attached to the document.

According to some aspects, a document processing system can comprise: a document pedestal configured to receive a document; an illuminating source comprising a plurality of illumination modules configured to illuminate the document, wherein each of the plurality of illumination modules are located at different positions relative to the document pedestal and configured to be illuminated in sequence to illuminate the document; an imaging device configured to capture a plurality of images, the plurality of images comprising at least one image of the document each time the document is illuminated by each of the plurality of illumination modules; and a controller unit configured to obtain a shadow profile of the document based on the plurality of images, and identify at least one of a boundary of the document and presence of a fastener attached to the document using the shadow profile.

In some embodiments, the plurality of illumination modules each comprise a plurality of LEDs.

In some embodiments, the system includes a document transfer end-effector comprising: a body; a suction applicator extending from a lower surface of the body, wherein the suction applicator is configured to apply a suction force upon at least a portion of a document to lift the document; and a document pincher comprising a rotatable arm configured to be rotated towards the body to contact the document and pinch the document between the document pincher and a lower surface of the body.

In some embodiments, the system includes a document platform configured to be positioned beneath the lifted document to separate the document from other documents on the pedestal. In some embodiments, the controller unit is configured to identify presence of an inverted fastener, the system further comprising: a first document platform configured to be positioned beneath the lifted document to separate the document from other documents on the pedestal; and a second document platform configured to be positioned over the lifted document, wherein the document is sandwiched between the first and second document platforms, and wherein the first and second document platforms are configured to be rotated around a horizontal axis to flip the document over.

In some embodiments, the system comprises a robot arm and wherein the controller unit is configured to instruct removal of the fastener using an end effector coupled to the robot arm.

In some embodiments, the system comprises a fastener removal end effector, the fastener removal end effector comprising: a pair of document contacting portion configured to contact a top surface of the document to hold the document in place; a fastener removal tab between the pair of document contacting portions, wherein the fastener removal tab is configured to be inserted between the fastener and the top surface of the document; and a fastener gripper above the fastener removal tab configured to grip the fastener to position at least a portion of the fastener between the fastener insert tab and the fastener gripper, wherein movement of the fastener gripper and the fastener insert tab away from the document removes the fastener.

In some embodiments, the fastener is a staple and wherein the at least one of the removal tab and the gripper comprises a width that is the same as a corresponding width of a crown of the staple.

According to some aspects, an automated system for document processing comprises: a document input configured to receive a document, wherein the document comprises a fastener attached thereto; a detection unit configured to collect information regarding the document and the fastener; a controller unit configured to receive the information from the detection unit to generate a processed information; and an interaction unit configured to manipulate at least one of the document and the fastener using a tool selected based on the processed information.

In some embodiments, the detection unit comprises: an illumination source comprising a plurality of illumination modules configured to illuminate the document and the fastener in sequence from different positions; and an image capture device configured to capture a plurality of images of the document and the fastener, wherein the plurality of images comprise at least one image of the document and the fastener each time an illumination module of the plurality of illumination modules illuminates the document and the fastener, wherein the controller is configured to compare the plurality of images to generate the processed information.

In some embodiments, the tool comprises a fastener removal tool, wherein the interaction unit is configured to be releasably coupled to the tool, and wherein the controller is configured to instruct the interaction unit to couple to the tool for manipulating at least one of the document and the fastener to remove the fastener.

In some embodiments, the controller is configured to use the processed information to determine a characteristic of at least one of the document and the fastener, and wherein the controller is configured to autonomously control, based on the characteristics, a movement of the interaction unit for manipulating at least one of the document and the fastener. wherein the first portion is fixed along the first portion of the motor in a direction substantially parallel to an axis of rotation of the motor.

Additional aspects and advantages of the present disclosure will become readily apparent to those skilled in this art from the following detailed description, wherein only exemplary embodiments of the present disclosure are shown and described, simply by way of illustration of the best mode contemplated for carrying out the present disclosure. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the present invention will be obtained by reference to the following detailed description that sets forth illustrative embodiments, in which the principles of the invention are utilized, and the accompanying drawings of which:

FIGS. 3A through 3E are preprocessed and processed images generated by the document and fastener identification system of FIG. 2.

DETAILED DESCRIPTION

Figure 1:
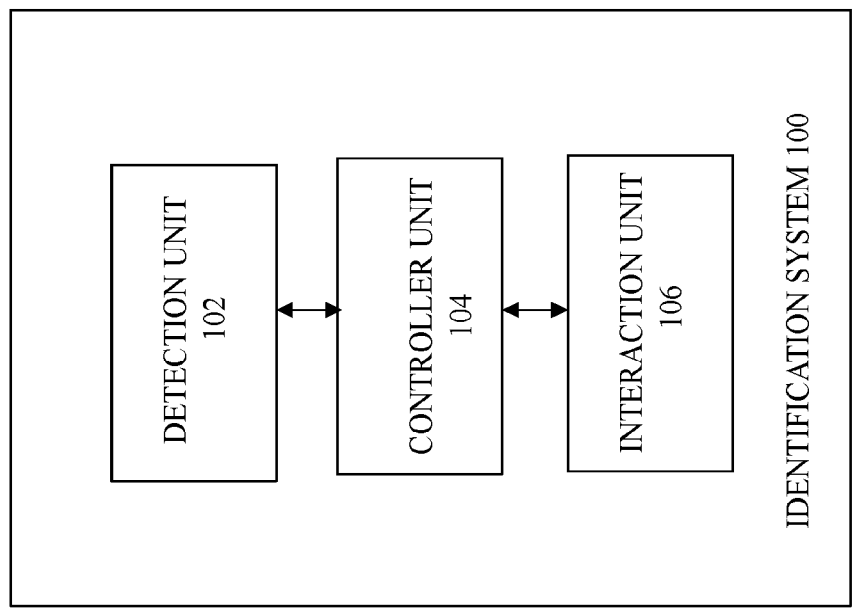
FIG. 1 is a schematic diagram of an example of an identification system.

While some embodiments of the invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention.

Immense amounts of information are often stored on physical documents, both by governmental agencies and private entities. Such documents can be kept in massive archives, warehouses, and/or vaults. The documents may or may not have been presorted. A stack of the documents can include documents of various sizes, shapes, thicknesses, materials, and/or may include documents oriented differently relative to other documents in the stack. The documents may or may not have fasteners attached thereto. A wide range of different types of fasteners may be used. Documents can be packaged in various manners, and/or stored within different types of containers. As an example, a Bankers Box® having a size of about 10 inches by 12 inches by 15 inches can store up to about 2,500 pieces of paper, and weigh about 25 pounds or more. An estimated of more than 6 billion of these types of boxes can be in storage, containing documents with information stored thereon that can be immensely difficult to access.

Physical document files may be difficult to locate, search, and/or manipulate. Reliance upon manual methods to locate, access, manipulate and/or extract the information from the documents can be costly, unreliable and/or subject to privacy concerns. For example, human handling of large amounts of documents may be slow, prone to error, damaging to human health due to exposure of chemical in the documents and/or fasteners, and/or raise security concerns when documents containing sensitive information are involved. Locating particular documents and/or transportation of such documents may be laborious and costly. Storage of information on physical documents may also be prone to loss, such as when the physical documents are lost, destroyed and/or mislabeled.

For at least one or more of the reasons described herein, extraction of information stored on physical documents may be difficult, thereby hindering or preventing access to an immense amount of stored information.

Systems and methods described herein relate to automating one or more of: (1) identifying a single sheet of physical document, such as from a stack of physical documents, (2) identifying the type of any fasteners attached to one or more sheets of physical documents, and (3) removal of any fasteners using appropriate removal tools based on the fastener type. Such systems and methods may be used to automate digitization of information stored on physical documents. The systems and methods may be incorporated into an automated end-to-end process which includes, for example, removal of documents from containers, manipulating the documents such that information stored on the documents can be extracted, extracting the information from the documents, and repackaging the documents for further processing. The automated end-to-end process may include more or fewer steps and the steps can be performed in various sequences.

Systems and methods described herein relating to automating identification of a single sheet of document, any fasteners attached thereto, and/or removal of the fasteners, can facilitate manipulation of the single sheet of document such that information stored on the document can be digitally scanned and digitally stored. Conversion of the information stored on physical documents to digital information can make the information easily accessible through digital searching. The digitized information can be stored on a remote server at a secured location, and/or may be easily and reliably duplicated upon request. Digital information may be more easily searched than information stored on physical documents, and can be easily sent to a target destination. Access of digital information may not involve any human intermediaries, thereby reducing or eliminating accidental or undesired access of sensitive information to individuals without access authority. Automation of digitization of the information can improve reliability, reduce costs, and/or avoid exposure of sensitive information to human errors. An automated process can facilitate increased speed and reliability in handling large volumes of documents.

Correctly detecting the presence of fasteners and/or identifying the type of fasteners, followed by successful removal of the fasteners, can be a complex task. Manual identification and removal of the fasteners can be complicated, tedious and time-consuming. Removal of different types of fasteners can involve use of numerous types of fastener removal tools and avoiding damage to documents may be difficult. Automated identification of fasteners may involve accurately determining whether features are false positives, such as accurately identifying photocopied fasteners which appear on the documents being processed.

A document and fastener identification system as described herein can be configured to identify a single sheet of document, such as from a stack of documents, identify presence of any document fastener devices on a document or stack of documents, identify the type of the fastener present, and/or removal of the fasteners using the appropriate tool. The system can be configured for automated identification of the single sheet of document, presence and type of any document fasteners, and/or removal of the fasteners. The system can be configured to manipulate a wide variety of document types containing written and/or printed information to prepare the documents for imaging such that the information stored on the documents can be stored in digital repositories. For example, the separated sheets of documents can be subsequently scanned such that information printed and/or written thereon can be digitally captured. In some embodiments, one or more systems described herein can be configured to separate grouped, attached, stacked and/or bound records into individual sheets. The types of documents which can be processed by one or more systems described herein can include, but are not limited to, legal, financial, and/or historic records. One or more of the systems described herein can be configured to process documents made of various materials, having various sizes, shapes and/or thicknesses.

Systems described herein can be used to remove a variety of fasteners. Such a system can automate identification and removal of fasteners, providing a cost effective, time efficient and reliable method of preparing documents such that information stored thereon can be digitized.

In some embodiments, one or more systems described herein can be suited for removal of staples. Staples may be particularly challenging to identify and/or remove due to its relatively small size and delicate structure. Due to its small size, a staple present on a document may be missed and/or errors in detection systems may falsely indicate presence of a staple when none is actually present. Removal of staples may be difficult due to the tendency of one or more of its legs of to break when the staple is pulled out from the document. One or more systems described herein can be configured to provide accurate identification and reliable removal of staples.

Referring to FIG. 1, a schematic diagram of an example of an identification system 100 is shown. A target material may be provided to the identification system for processing. The target material may comprise one or more documents. A single document may be presented. Alternatively or in addition, multiple documents may be presented as a stack, pile, or any other manner. The identification system can comprise one or more components to collect information regarding the target material. The identification system can use this information to identify a sheet of document in the target material, and/or presence and/or characteristics of any fasteners on the target material. In some embodiments, the identification system can include one or more components to interact with the target material, including any fasteners attached thereto, so as to achieve removal of the fasteners.

The identification system 100 can be configured to identify one or more sheets of a document, and/or information pertaining to any fasteners on a document. The document may be a single sheet or may comprise multiple sheets that may be fastened together with aid of one or more fasteners. The sheet may be a sheet of paper or any other media type, as provided in detail elsewhere herein. The document may be identified and/or differentiated from other documents. A single sheet of a document may be identified and/or differentiated from other sheets within the document, or other sheets of other documents. A boundary (e.g., edge) of a sheet may be identified. The boundary of the sheet may be useful for detecting and differentiating the sheet from other sheets.

A document may comprise one or more fasteners. Alternatively, the document may not have a fastener. The identification system 100 may be configured to collect information pertaining to any fasteners on a document, such as the presence or absence of any fasteners on the document, type of fastener, location of fastener, dimensions of fastener, or any other information pertaining to the fastener.

The identification system 100 can include a detection unit 102, a controller unit 104, and/or an interaction unit 106. The detection unit can be configured to collect information regarding the target material to identify a single sheet of document, and/or collect information pertaining to the fasteners. For example, the detection unit can include one or more detector components configured to collect information relating to the target material and/or fasteners attached to the target material. The detection unit and the controller unit can be in electrical communication with one another such that the detection unit can provide the collected information to the controller unit for analysis. The detection unit can receive instructions from the controller unit based on information collected by the detection unit. The controller unit may also be in electrical communication with interaction unit such that the controller unit can instruct the interaction unit to perform one or more tasks based on the information gathered by the detection unit. The interaction unit can be configured to receive instructions from the controller unit and perform one or more tasks to enable identification of the single sheet of document and/or one or more fasteners attached to the target material, and/or removal of the fasteners.

Although the detection unit 102 and the interaction unit 106 are described herein as being a part of one system, it will be understood that the detection unit and the interaction unit can be a part of separate system. For example, collecting information regarding a document and/or any fasteners thereon can be automated using a system different from an automated system configured to interact with the document and/or fasteners.

A target material can be presented to the identification system 100. The identification system can be configured to receive the target material presented in various forms. The target material may comprise one document or a stack of documents. The document or stack of documents may be presented to the identification system manually by an operator of the system and/or via an automated process. The document or stack of documents may be presented as a single sheet of document, a plurality of sheets of documents, a single stack of documents, a plurality of stacks of documents. The document or document stack may be presented in a container, such as a tray, a box (e.g., Bankers Boxes®), a bin, and/or a folder. For example, a container containing a document stack can be loaded onto a receiving port of the identification system and the container can be moved by the system to a desired height to transfer one or more of the documents from within the container to for processing. The system may comprise one or more mechanical components to move the container vertically and/or laterally, such as via tracks over which the container is placed. A desired height of the container can be preset and/or determined using one or more sensors known to one skilled in the art. In some embodiments, the document or document stack may be presented without any type of container. A document stack presented to the identification system may not be pre-sorted. For example, the document stack can be vertically stacked without any particular sequence in the stacking. In some embodiments, the document stack may be pre-sorted.

Any description herein of a stack of documents may apply to a plurality of documents presented in any manner. In some embodiments, the stack of documents can comprise documents having a wide variety of characteristics. The stack of documents may comprise documents of different materials shapes, sizes, and/or thicknesses. The documents may be of different types from one another. In some instances, various sheets within a document may be of different types from one another. Different types of documents may have different characteristics. The stack of documents may comprise one or more documents which have an adhesive on at least a portion thereof. In some embodiments, one or more documents of the stack processed by the identification system 100 may be oriented differently from one or more other documents in the stack. Optionally, one or more sheets within a document may be oriented differently from one or more other sheets within the document, or from different documents. In some embodiments, a stack of documents can comprise documents having the same or substantially the same characteristics. For example, the documents can be of the same material, shape, size, orientation and thickness. The documents and/or sheets of the documents may be of the same type.

The detection unit 102 can be used to identify one or more edges of single sheets of documents comprising one or more of any number of flexible materials having information stored thereon. Identification of the single sheets of documents can facilitate separation of the sheets from one another for subsequent processing, such as for scanning of information from the individual sheets. In some embodiments, the detection unit can be configured to identify a single sheet of paper, including printing paper, writing paper, and/or drawing paper. In some embodiments, the detection unit can be configured to identify a single sheet of rice paper and/or thermal paper. The single sheet of paper may be in a stack of documents, including a stack of papers or a stack including other types of flexible material. The single sheet may be within a document that may comprise one or more sheets that may be fastened together. In some embodiments, one or more of the documents can be other types of flexible material, including card stock, file folders, cardboard, acetate film, polyester film, synthetic paper, microfiche, tissue paper, X-ray film, blueprints, maps, cloth, parchment, combinations thereof and/or the like. In some embodiments, flexible material comprises paper. A single document may comprise a single type of flexible material or multiple types of flexible materials. A plurality of documents may comprise as single type of flexible material or multiple types of flexible materials. The flexible material may have a variety of sizes and/or shapes. In some embodiments, a target material can include a plurality of sheets of flexible material, where the flexible material comprises different sizes, shapes, thicknesses and/or orientations.

In some embodiments, the identification system 100 can be configured to identify a sheet of flexible material having a thickness less than about 0.3 millimeter (mm), 0.2 mm, 0.1 mm, 0.05 mm, or 0.1 mm. In some embodiments, the flexible material can have a thickness of up to about 5 mm, about 4 mm, about 3 mm, about 2 mm. In some embodiments, the identification system can be configured to identify a sheet of flexible material having a thickness of about 0.01 mm to about 5 mm, including about 0.01 mm to about 4 mm, about 0.01 mm to about 3 mm, or about 0.01 mm to about 4 mm. The identification system may be capable of detecting and/or differentiating sheets having thickness less than any of the values described herein, greater than any of the values described herein, or falling within a range between any two of the values described herein.

As described herein, in some embodiments, the flexible material may be paper. The paper may be of any number of sizes, shapes and/or thicknesses. For example, the detection unit 102 may be configured to identify edges of a sheet of paper having a thickness less than about 0.3 mm, 0.2 mm, 0.1 mm, 0.05 mm, or 0.01 mm. In some embodiments, the paper can have a thickness of up to about 5 mm, about 4 mm, about 3 mm, about 2 mm. In some embodiments, the identification system can be configured to identify a sheet of paper having a thickness of about 0.01 mm to about 5 mm, including about 0.01 mm to about 4 mm, about 0.01 mm to about 3 mm, or about 0.01 mm to about 4 mm. The detection unit may be capable of detecting and/or differentiating sheets of papers having thickness less than any of the values described herein, greater than any of the values described herein, or falling within a range between any two of the values described herein. In some embodiments, the detection unit can be configured to identify a single sheet of paper in a stack of documents, including a sheet of paper in an orientation different from an immediately adjacent document in a stack, such as a document beneath the paper.

In some embodiments, a document can be any number of different types of products comprising one or more flexible material described herein. In some embodiments, a document can be a foldable card, a business card, a sheet having adhesive on at least a portion of one surface (e.g., Post-it® Note note), an envelope, a folder, a document divider, and/or a label. In some embodiments, the document can comprise any number of sizes, including for example legal size, letter size, ledger, size, or tabloid size.

In some embodiments, the identification system 100, for example using information collected by the detection unit 102, can be configured to determine if any fastener is present on a document or stack of documents. In some embodiments, the identification system can be configured to determine what type of fastener is on a document. For example, using information collected by the detection unit, the identification system can be configured to determine if the fastener is one or more types of fasteners described herein. In some embodiments, the identification system can be configured to determine a location of the fastener on the document or document stack. For example, the identification system can be configured to determine where on a document or document stack one or more fasteners are located, including when a document or document stack comprises multiple fasteners attached thereon on various locations on the document or document stack. In some embodiments, the identification system can be configured to determine an orientation of one or more fasteners on a document or document stack. For example, the identification system can be configured to determine a lateral angle of a fasteners, and/or if a fastener is inverted. In some embodiments, the controller unit 104 can be configured to process the information collected by the detection unit to make one or more determinations described herein.

The identification system 100 may advantageously be configured to (1) identify single sheets of documents of various compositions and/or dimensions, and/or (2) identify information pertaining to any fasteners, such as the type, location and/or orientation of any fasteners on a document or document stack. The identification system may be able to process documents that are not limited to a single type of material, orientation in which documents are positioned, and/or dimension, and may have one or more fasteners attached thereto in various manners. Pre-sorting documents processed by such a system may be reduced or eliminated, facilitating automated processing of documents without or substantially without manual intervention, thereby increasing speed of document processing, reduce associated costs and/or improve reliability of the document process due at least in part to reduced human errors. As described herein, the identification system may be configured to process documents to prepare documents for a digitization process in which information stored on the documents is extracted and stored digitally. An identification system which can be configured to handle documents of various characteristics, including documents having different fasteners attached thereto in various manners, can facilitate digitization of the information on the documents, such that digital access of the information can be provided at reduced costs.

In some embodiments, the identification system 100 can be configured to identify any number of different types of fasteners. For example, the detection unit can be configured to differentiate between various types of fasteners so as to determine which of the various types of fasteners is on a document or document stack, including the manner in which the fastener is attached to the document or document stack. A fastener may be any number of different implements configured to hold multiple documents together, such as various types of mechanical devices configured to hold together multiple documents. For example, the fastener may comprise one or more portions which are configured to be positioned over opposing surfaces of the documents the fastener is configured to hold together. In some embodiments, the fastener can include one or more portions which extend through a corresponding portion of each of the documents it is attached to. For example, the fastener may comprise one or more portions which pass through each of the documents it is configured to bind together and one or more other portions which are configured to be positioned over opposing surfaces a top document and bottom document of the multiple documents bound by the fastener. The identification system can be configured to identify fasteners such as paper clips, spring clips, metalbrads, punched holes fasteners, rubber bands, spiral binding, binder clips, spring binder clips, bookbinding, two-prong fasteners (e.g., two-prong metal fasteners), spiral rings, ring binding, gachuck clips, plastiklip plastic clips, corner clips, butterfly clamps, owl clips, circular paper clips, papercloops, adhesives (e.g., tape), combinations thereof and/or the like. In some embodiments, the fasteners can comprise a file folder, including an accordion folder. In some embodiments, the detection unit 102 can be configured to detect and/or identify staples, including plastic staples, and non-ferrous metal staples. As described in further details herein, the interaction unit 106 can comprise one or more end effectors configured to remove the identified fasteners.

In some embodiments, the detection unit 102 comprises one or more components to sense an object, such as a document and/or fastener. The one or more components may provide one or more of optical sensing, thermal sensing, laser imaging, infrared imaging, capacitance sensing, mass sensing, vibration sensing across at least a portion of the electromagnetic spectrum, and magnetic induction sensing. In some embodiments, the detection unit comprises one or more tactile modalities. The tactile sensing can be used to detect any anomalies on a document or document stack. In some embodiments, the detection unit can be configured to provide acoustic sensing, including sensing using frequencies beyond the range of human hearing. In some embodiments, the information collected by the detection unit can be used to determine a shape of a document, such as by detecting a boundary of the document. In some embodiments, the detection unit can be used to determine a shape, material, orientation and/or location of one or more fasteners on a document or stack of documents.

In some embodiments, the detection unit 102 can be configured to apply one or more techniques configured to detect metallic materials, such as to detect fasteners comprising a metallic material. In some embodiments, the detection unit can be configured to apply a magnetic field to facilitate detection of ferromagnetic materials, including iron, nickel, cobalt, and/or combinations thereof.

The detection unit 102 can include a variety of sensing components configured to gather information relating to the documents to enable identification of a single sheet of documents and/or the presence and type of any fasteners present thereon. The detection unit can be configured to use various techniques to detect and/or identify a single sheet of document and/or fastener. In some embodiments, the detection unit can be configured to contact the document and/or fastener to measure one or more characteristics of the document and/or fastener, such as through one or more tactile modalities. In some embodiments, the detection unit can be configured to collect information regarding the document and/or fastener without physically contacting the document and/or fastener. In some embodiments, the detection unit can include one or more of an emission source and a measurement device. In some embodiments, the detection unit can be configured to emit a detection signal configured to probe the document and/or fastener, including for example an electromagnetic signal and/or an acoustic signal. In some embodiments, the detection unit comprises both an emission source and a measurement device. For example, the measurement device may be configured to measure an electromagnetic radiation signal emitted by and/or reflected by the document and/or fastener, due at least in part to response of the document and/or fastener to the detection signal emitted by the emission source. As described in further details herein, the detection unit may comprise one or more components for a photometric stereovision system. In some embodiments, the detection unit can include a measurement device to collect information regarding the document and/or fastener, without or substantially without emitting any detection signals for the measurement. For example, as described in further details herein, the detection unit may comprise one or more components for an infrared sensor and/or an inductive sensor.

In some embodiments, the detection unit 102 may comprise an illumination source configured to illuminate the document or document stack with one or more types of electromagnetic radiation. In some embodiments, the electromagnetic radiation can include illumination in one or more of the visible spectrum, infrared spectrum, the ultraviolet spectrum, and ionizing radiation spectrum. In some embodiments, the ionizing radiation can include x-rays.

In the some embodiments, the detection unit 102 may be configured to illuminate a document or stack of documents for analysis using photometric stereovision. The detection unit may be configured to provide information to enable determining three-dimensional (3-D) information relating to the target material. In some embodiments, the detection unit may be configured to obtain information to determine a boundary of a sheet of document to facilitate identification of a single sheet of document. In some embodiments, the detection unit can be configured to provide edge detection of a sheet of document.

Referring again to FIG. 1, the interaction unit 106 may be configured to perform various tasks to manipulate a document, document stack and/or a fastener. The interaction unit may comprise one or more tools configured to perform such tasks. In some embodiments, the interaction unit may comprise one or more positioning components for coupling to the one or more tools, for example to facilitate moving the one or more tools to a desired location and/or orientation. For example, the one or more positioning components may comprise one or more mechanical arms for bringing the one or more tools to the document, document stack and/or fastener, and/or orienting the one or more tools relative to the document, document stack and/or fastener. In some embodiments, the one or more components may comprise one or more robot arms. The one or more positioning components can be coupled, such as releasably coupled, to appropriate tools for performing desired tasks. The tools may be interchangeable. For example, the one or more positioning components may be configured to be switch between different tools depending on the task desired. The tools may be exchanged, swapped, detached, and/or reattached to the one or more positioning components. In some embodiments, the tools are not interchangeable.

The interaction unit 106 may comprise one or more tools to move a document and/or document stack, such as to transfer the document and/or document stack between a first location and a second location. In some embodiments, the interaction unit may comprise one or more tools to change an orientation of a document and/or document stack, such as to rotate the document and/or document stack. In some embodiments, the interaction unit may comprise a tool to flip over a document and/or document stack. In some embodiments, the interaction unit may comprise one or more tools to separate a document or document stack from another document and/or document stack. In some embodiments, the interaction unit may comprise one or more tools for manipulating a fastener, such as to remove the fastener from a document and/or document stack.

In some embodiments, the interaction unit 106 may be configured to separate a document or document stack from another document and/or document stack using various techniques, including using guidance from the detection unit 102. The interaction unit may be configured to separate a document or document stack from another document and/or document stack and into groups, including by folder (e.g., by file folder, and/or accordion folder), attached and/or bound groups, and/or into single sheets. In some embodiments, the interaction unit can be configured to separate a document or stack of documents from one or more folders, including opening of folders (e.g., accordion folders and/or file folders) and/or removal of the document or document stack from folders. In some embodiments, the interaction unit can be configured to perform the separation by physically contacting the document or document stack. In some embodiments, the interaction unit can be configured to perform the separation by using air pressure, such as using air pressure greater than and/or less than atmospheric pressure. In some embodiments, the interaction unit can be configured to perform the separation by using gravity, such as by placing the document or document stack on a sloped plane to enable gravity to separate the document or document stack from any other documents and/or stacks of documents. In some embodiments, the interaction unit can comprise a mechanical roller can be used to facilitate separation using gravity. For example, the mechanical roller can be used to contact the document or document stack to facilitate the separation.

In some embodiments, one or more positioning components of the interaction unit 106 may comprise one or more robot arms. The robot arm can be a multi-axis robot arm. In some embodiments, the robot arm can have two or more axes of motion. In some embodiments, the robot arm can be a two-axis robot arm, a three-axis robot arm, four-axis robot arm, a five-axis robot arm or a six-axis robot arm. In some embodiments, robot arm may be a single-axis robot arm.

In some embodiments, the one or more tools of the interaction unit 106 may comprise an end effector configured to be coupled to a position component, such as a robot arm. In some embodiments, the robot arm can be configured to be coupled to one end effector at any one time. In some embodiments, the robot arm can be configured to be coupled to more than one end effector at any one time. In some embodiments, the robot arm can be configured to switch between different end effectors. For example, the robot arm can be configured to release an end effector once a task using the end effector is completed and to couple to a different end effector suited to perform a subsequent task. In some embodiments, the entire robot arm can be switched out.

In some embodiments, one or more end effectors can be coupled to a position component, such as a robot arm, to perform various tasks. In some embodiments, one or more end effectors can be configured for fastener removal. In some embodiments, one or more end effectors can be configured for document manipulation, such as to manipulate individual sheets of documents and/or multiple sheets of documents. In some embodiments, one or more end effectors can be configured to manipulate one or more fasteners and one or more documents. The one or more end effectors can be releasably coupled to the robot arm. For example, the robot arm can be configured to switch between appropriate removal tools based upon the detected type of fastener.

In some embodiments, more than one robot arm can be used. In some embodiments, a robot arm for fastener removal can be different from a robot arm configured for manipulation of sheets of documents.

In some embodiments, the identification system 100 may be configured to provide documents for further processing, such as providing documents having fasteners removed for digitization of information stored on the documents. In some embodiments, the processed documents provided by the identification system can be scanned such that information stored thereon can be extracted. For example, information on the documents may be extracted using one or more optical scanning techniques. One or more character recognition algorithms can be applied to convert the information into digital format. In some embodiments, information from the documents can be extracted using an optical character recognition (OCR) process.

The identification system 100 can enable fully automated identification of single sheets of documents, presence and types of fasteners, and/or removal of fasteners. The identification system can be a part of an assembly line configured to enable automated digitization of information stored on physical documents. In some embodiments, each of the detection unit 102 and the interaction unit 106 can be configured to operate without or substantially without human interaction. The detection unit and the interaction unit may be configured to operate together to fully automate identification of documents and/or fasteners, and/or removal of fasteners from documents presented to the identification system. For example, the system can be configured to process a document or document stack, such as to identify sheets of documents, presence and types of fasteners, and/or removal of fasteners, after receiving input from an operator to initiate the process. In some embodiments, the identification system can be semi-automated. For example, the identification system can be configured to receive input from an operator after processing of a document or document stack is initiated, such as at one or more points during the process. The operator may be prompted by the system during the process to input a confirmation command, and/or one or more parameters regarding the document or document process being processed. The identification system 100 can be part of an assembly line configured to fully automate or semi-automate digitization of information stored on the document or document stack.

The controller unit 104 can be configured to control one or more other components of the identification system 100, such as to enable automation of processes to identify sheets of documents, presence and types of fasteners, and/or removal of fasteners. The controller unit 104 may comprise one or more processors, including a central processing unit (CPU). In some embodiments, the processor may comprise a single core processor. In some embodiments, the processor may comprise a multi-core processor. In some embodiments, the controller unit comprises a plurality of processors for parallel processing. The controller unit may have one or more of a memory (e.g., random-access memory, read-only memory, and/or flash memory) and an electronic storage unit (e.g., hard disk). The electronic storage unit can be a data storage unit and/or data repository for storing data. In some embodiments, the controller unit can have a communication interface (e.g., network adapter) for communicating with one or more other components and/or systems. For example, as described in further details herein, the controller unit may be configured to communicate with one or more other components of the identification system 100, such as the detection unit 102 and/or the interaction unit 106. In some embodiments, the controller unit can be in communication with one or more remote systems, such as remote servers located in a different room, different building, and/or different facilitate. In some embodiments, the controller unit can have one or more peripheral devices, such as cache, other memory, data storage and/or electronic display adapters. The memory, storage unit, interface and/or peripheral devices can be in communication with the processor of the controller unit through a communication bus, such as a motherboard.

The controller unit 104, such as a processor and a memory of the controller unit, can be in communication with the detection unit 102 and/or the interaction unit 106. The controller unit can be configured receive information from the detection unit, such as information collected by the detection unit relating to the document or document stack being processed. The controller unit memory may be configured to store information received from the detection unit and/or various algorithms for performing the analyses described herein. In some embodiments, the controller unit can be configured to process the information from the detection unit relating to the document or document stack using the one or more algorithms. For example, the processor of the controller unit can execute a sequence of machine-readable instructions, which can be embodied in a program or software. The instructions may be stored in a memory location, such as the memory of the controller unit. The instructions can be directed to the processor, which can subsequently program or otherwise configure the processor to implement methods of the present disclosure. Examples of operations performed by the processor can include fetch, decode, execute, and/or writeback. In some embodiments, the processor can be configured to execute the various algorithms using the information relating to the document, document stack and/or fastener to perform the analysis as described herein.

In some embodiments, the controller unit can be in communication with one or more remote servers. In some embodiments, one or more of the various analyses of information from the detection unit 102 can be performed remotely, and the analysis is transmitted to the controller unit 104. The controller unit can be operatively coupled to a computer network ("network") with the aid of the communication interface, such as to a wired and/or wireless network. The network can be the Internet, an internet and/or extranet, or an intranet and/or extranet that is in communication with the Internet. The network in some cases is a telecommunication and/or data network. In some embodiments, the network comprises a local area network ("LAN"), and/or a wide area network ("WAN"). The network can include one or more computer servers, which can enable distributed computing, such as cloud computing. The network, in some cases with the aid of the computer system, can implement a peer-to-peer network, which may enable devices coupled to the computer system to behave as a client or a server.

The controller unit 104 can be configured to send instructions, based on the analyses, to the detection unit and/or the interaction unit to control movement of the detection unit 102 and/or interaction unit 106, so as to enable automation of the identification and manipulation process as described herein, such as to enable a fully automated or semi-automated process.

In some embodiments, the processor of the controller unit 104 can be part of a circuit, such as an integrated circuit. One or more other components of the controller unit can be included in the circuit. In some cases, the circuit is an application specific integrated circuit (ASIC). In some embodiments, the storage unit of the controller unit can store files, such as drivers, libraries and saved programs. The controller unit can store user data, e.g., user preferences and user programs. The controller unit in some cases can include one or more additional data storage units that are external to the controller unit, such as located on a remote server that is in communication with the controller unit through an intranet or the Internet. The controller unit can communicate with one or more remote computer systems through the network as described herein. For instance, the controller unit can communicate with a remote computer system of a user. Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. In some embodiments, an operator can access the controller unit via the network.

Methods as described herein can be implemented by way of machine (e.g., computer processor) executable code stored on an electronic storage location of the controller unit 104, such as, for example, on the memory or electronic storage unit of the controller unit. The machine executable or machine readable code can be provided in the form of software. During use, the code can be executed by the processor of the controller unit. In some cases, the code can be retrieved from the storage unit and stored on the memory for ready access by the processor. In some situations, the electronic storage unit can be precluded, and machine-executable instructions are stored on memory.

The code can be pre-compiled and configured for use with a machine having a processer adapted to execute the code, or can be compiled during runtime. The code can be supplied in a programming language that can be selected to enable the code to execute in a pre-compiled or as-compiled fashion.

One or more aspects of the systems and methods provided herein, such as the controller unit 104, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit of the controller unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The controller unit 104 can include or be in communication with a user interface (UI). Examples of UI's include, without limitation, a graphical user interface (GUI) and web-based user interface. The operator may be able to input information for controlling the system using the user interface. For example, the operator may be able to enter one or more parameters using the user interface, to initiate a process and/or as part of the process, including when prompted by the system. The user interface may comprise an electronic display. The electronic display may be configured to allow an operator to view information relating to one or more components of the identification system 100, and/or one or more parameters of a process previously, currently being and/or will be completed by the system. The electronic display may enable the operator to view information gathered by the detection unit 102.

As described herein, one or more systems and/or processes as described herein can enable a fully automated and/or semi-automated process for processing documents and/or document stacks, such as to identify sheets of documents, presence and types of fasteners, and/or removal of fasteners. In some embodiments, automating the identification of documents and/or fasteners, and/or removal of the fasteners can advantageously provide increased throughput in the processing of documents to digitize information stored thereon.

Although the detection unit 102, controller unit 104, and interaction unit 106 are described with reference to FIG. 1 as being distinct components of the identification system 100, it will be understood that, in some embodiments, one or more of the detection unit 102, controller unit 104, and interaction unit can be a part of one component.

In some embodiments, one or more of a detection unit and an interaction unit may be a part of different systems. For example, the detection unit can be a part of a first automated system separate from and/or located at a different location from a second automated system comprising the interaction unit, and documents processed by the first automated system may be transferred to the second automated system for further processing.

Figure 2:
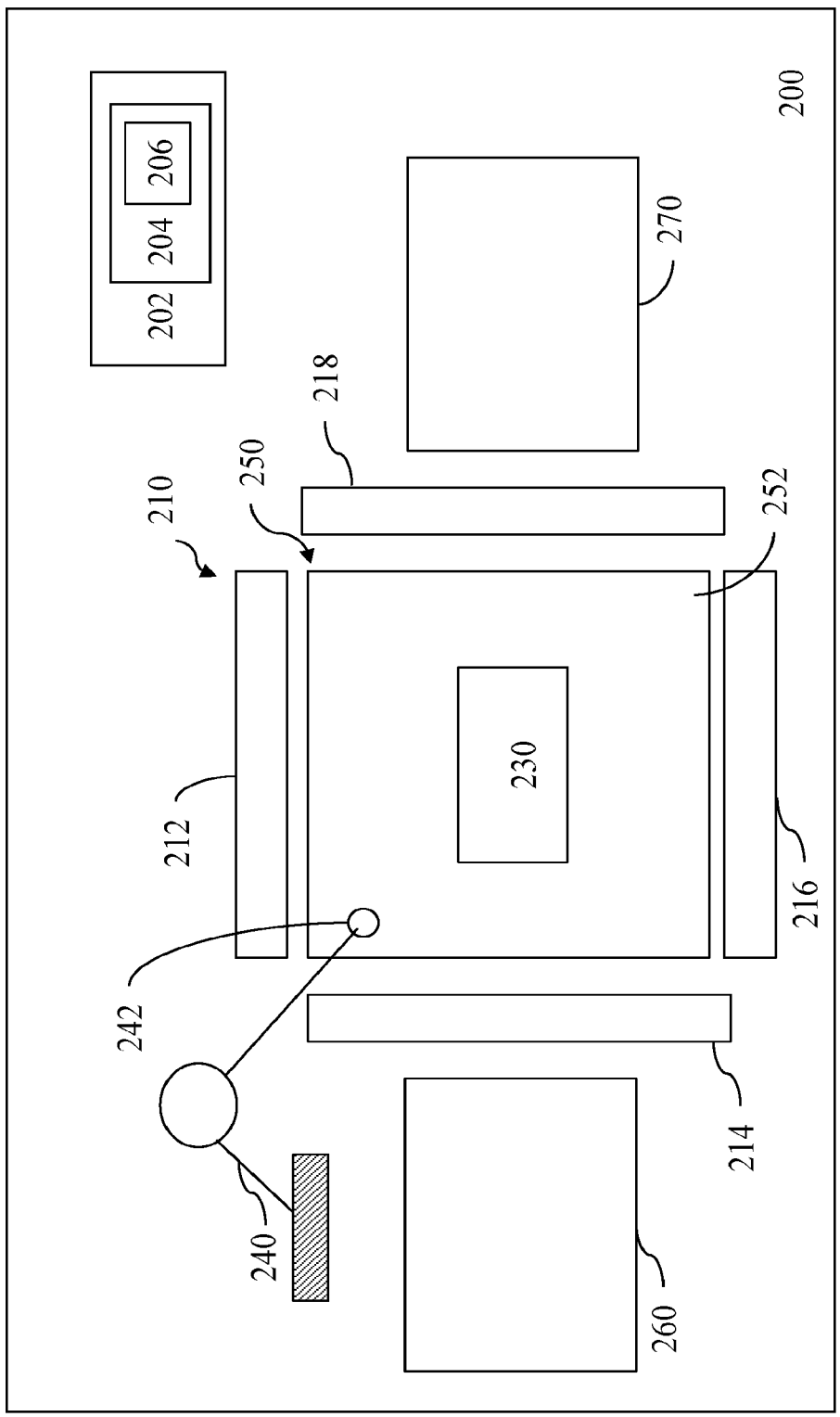
FIG. 2 is a schematic diagram of an example of a document and fastener identification system.

FIG. 2 is a schematic diagram of an example of a document and fastener identification system 200. The document and fastener identification system 200 can be an example of the identification system 100 as described with reference to FIG. 1. The document and fastener identification system 200 can include an illumination source 210, an image capture device 230, a robot arm 240, a document pedestal 250, a first document platform 260, and a second document platform 270. The document and fastener identification system 200 may include a controller 202 in electrical communication with one or more components of the document and fastener identification system 200, such as the illumination source 210, image capture device 230, robot arm 240, document pedestal 250, first document manipulator 260, and/or second document manipulator 270, to control the one or more components and/or receive information from the one or more components for controlling the components. The controller 202 may include a processor for receiving and processing the image data from the image capture device 230.

The document and fastener identification system 200 may include a user interface 204 to allow an operator to interact with the system. For example, the operator may be able to manually control one or more components of the system and/or input information for controlling the system using the user interface. The user interface can allow the operator to interact with the system. The operator may input values using the user interface to initiate and/or control a process. In some embodiments, the operator may input one or more values using the user interface such that the system can operate autonomously. For example, a document, document stack, multiple documents, and/or multiple document stacks can be loaded onto the system (e.g., by an operator and/or an automated process), such as onto an input port of the system, and the system may be configured to process the document without further operator input. In some embodiments, the operator may input one or more parameters to initiate the process and the system can be configured to complete the process fully automated without further operator intervention. In some embodiments, the system can be configured to receive a start instruction and the system can complete the process without further instructions from the operator. For example, upon the operator entering a "start" command, the system can proceed to illuminate a document or document stack using the illumination source 210, capture a plurality of images of a document or document stack using the image capture device 230, and manipulate the document or document stack using one or more of the robot arm 240, first document manipulator 260, and second document manipulator 270. In some embodiments, the system can be configured to process the document, document stack, multiple documents, and/or multiple document stacks based upon one or more parameters entered by the operator, such as one or more parameters relating to one or more characteristics of the document, document stack, multiple documents, and/or multiple document stacks.

In some embodiments, the system 200 can be configured to be semi-autonomous such that the system is configured to receive input from the operator at one or more points during the operation of the system after initiation. For example, the system 200 can be configured to prompt the operator for input to input one or more characteristics of the document, document stack, multiple documents, and/or multiple document stacks being processed, and/or confirm an operation and/or detected characteristic of the document, document stack, multiple documents, and/or multiple document stacks. For example, an operator can be requested to input a "confirm" command during one or more steps of the process before the system will proceed further. In some embodiments, the system can be configured to operate both in a fully automated mode and a semi-automated mode, such as based on input from an operator. In some embodiments, the system can be configured to allow the operator to intervene during the process, such as by inputting a "pause" and/or "stop" command.

In some embodiments, the operator can manually control one or more components of the system using the user interface, such as one or more of the illumination source 210, image capture device 230, robot arm 240, document pedestal 250, first document platform 260, and second document platform 270. In some embodiments, the user interface may be co-located with the system. In some embodiments, the user interface may be remote from the system, for example to enable remote operation of the system and/or remote viewing of one or more parameters of the process performed by the system. In some embodiments, the user interface can be in a different room, building, and/or facility. In some embodiments, the user interface can be in the same room, building, and/or facility.

In some embodiments, the user interface 204 can include a visual display 206. In some embodiments, the visual display can include a display of various parameters of the system 200, including one or more parameters of the document and/or document stack being processed. As will be described in further details herein, the visual play can be configured to display to an operator an unprocessed image, such as an image captured by the image capture device 230 and/or a processed image, such as a processed image provided by the processor of the controller 202 using information from the unprocessed image. In some embodiments, the visual display may display one or more status indicators of the components of the system, including status indicators of one or more of the illumination source 210, image capture device 230, robot arm 240, document pedestal 250, first document platform 260, and second document platform 270. The visual display may be configured to display to the operator values entered by the operator or a previous operator. The visual display may show a process history of the system.

In some embodiments, the document and fastener identification system 200 can be configured to identify one or more edges of a single document and/or presence of a fastener on a document or document stack at least in part by analyzing any shadows captured by the document and fastener identification system 200. In some embodiments, the document and fastener identification system 200 can be configured to provide photometric stereovision analysis of the document or document stack. The analysis may be used to identify edges of a single document and/or information about a fastener, if present.

The document pedestal 250 can be configured to receive a document or document stack analyzed by the document and fastener identification system 200. For example, a document or document stack can be received on an upper surface 252 of the document pedestal 250. The document or document stack can be positioned on the document pedestal manually, such as by an operator. In some embodiments, the document or document stack can be positioned on the document pedestal by an automated process. For example, the document or document stack can be presented to the document and fastener identification system 200 at an input, and the document or document stack can be positioned onto the document pedestal through an automated process. The document or stack of documents may be presented as a single sheet of document, a plurality of sheets of documents, a single stack of documents, a plurality of stacks of documents.

The document or document stack can be presented to the system 200 in various forms. In some embodiments, the system 200 can be configured to receive the document or document stack in a container, such as a tray, a box, a bin, and/or a folder. For example, a container containing a document stack can be loaded onto a receiving port of the identification system and the container can be moved by the system to a desired height to transfer one or more of the documents from within the container to the pedestal 250. The system may comprise one or more mechanical components to move the container vertically and/or laterally, such as via tracks. For example, the container can be lifted, lowered and/or moved laterally by the system to reach a desired position for transferring documents from the container to the pedestal 250. Once the desired position is reached, the system may be configured to automate transfer of documents from the container. As described herein, a desired height of the container can be preset and/or determined using one or more sensors.

The illumination source 210 can be positioned relative to the document pedestal 250 such that the document or document stack positioned on the pedestal 250 can be illuminated by the illumination source 210. The illumination source may be positioned above the document pedestal 250 and oriented such that the illumination from the illumination source provides desired illumination of the document or document stack on the pedestal. For example, the illumination source can be oriented such that one or more illumination devices providing the illumination face an upper surface 252 surface of the pedestal. In some embodiments, a surface of the illumination devices through which illumination is emitted are oriented at an angle of about 30° to about 90° relative to a upper surface of the pedestal, including at an angle of about 30° to about 80°, about 30° to about 60°, about 45° to about 90°, or about 45° to about 60°. The orientation angle of the illumination source may be less than any of the values described herein, greater than any of the values described herein, or falling within a range between any two of the values described herein. The illumination source 210 can be positioned relative to the pedestal 250 such that other components of the system 200 do not cast any shadow on any portion of the document or document stack positioned on the pedestal 250 when the document or document stack is illuminated by the illumination source 210. A shadow cast upon the document or document stack may result in a false positive in the identification of a fastener and/or one or more edges of a document.

The illumination source 210 can comprise a plurality of illumination modules. The plurality of illumination modules may each be positioned at a different location relative to the pedestal 250 such that the document or document stack on the pedestal 250 can be illuminated by sources located at different positions relative to the document or document stack. For example, the illumination modules can be at different locations relative to one another. Illuminating the document or document stack from different positions can provide allow capture of different shadow profiles of three-dimensional features, such as the edges of a single document and/or any three-dimensional objects protruding from the top of the document or document stack, such as a fastener.

In some embodiments, the illumination source 210 can comprise four illumination modules 212, 214, 216 and 218. The four illumination modules can positioned over and surround the pedestal 250. For example, one of the illumination modules can be at each of a 0° position, 90° position, 180° position and 270° position. In some embodiments, the four illumination modules can be positioned differently around the pedestal. The four illumination modules can be equidistant or substantially equidistant from the pedestal to facilitate illuminating the document or document stack by the same or similar illumination intensity by each of the four illumination modules. The four illumination modules can be at a variety of vertical distances from the upper surface 252 of the pedestal. The vertical distance can selected such that the document or document stack on the pedestal is sufficiently illuminated by the illumination modules. In some embodiments, a vertical distance of one or more of the illumination modules from the upper surface 252 of the pedestal 250 can be about 4 feet (ft) to about 10 ft, including about 4 ft to about 8 ft, or about 4 ft to about 6 ft. The vertical distance of one or more of the illumination modules from the upper surface of the pedestal may be less than any of the values described herein, greater than any of the values described herein, or falling within a range between any two of the values described herein.

In some embodiments, a different number of illumination modules can be used. In some embodiments, fewer than four illumination modules can be used, such as two or three. In some embodiments, more than four illumination modules can be used, such as five, six, seven, eight, or more. The plurality of illumination modules may be positioned such that they modules are uniformly or substantially uniformly distributed radially over the pedestal 250. An illumination source comprising n number of illumination modules may have the modules at each of a multiple of 360°/n position around the pedestal. For example, a system comprising five illumination modules may comprise a module at each of a 0° position, 72° position, 144° position, 216° position, and 288° position.

As described herein, the illumination source 210 may be positioned above the document pedestal 250 and oriented such that the illumination from the illumination source provides desired illumination of the document or document stack on the pedestal. For example, each of the plurality of illumination modules of an illumination source can have an illumination emitting surface oriented at an angle of about 30° to about 90° relative to a upper surface 252 of the pedestal 250, including at an angle of about 30° to about 80°, about 30° to about 60°, about 45° to about 90°, or about 45° to about 60°. The orientation angle of the illumination modules may be less than any of the values described herein, greater than any of the values described herein, or falling within a range between any two of the values described herein.

Each of the plurality of illumination modules can comprise one or more illumination devices oriented toward the document or document stack for illuminating the document or document stack. In some embodiments, each of the plurality of illumination modules can comprise one or more light-emitting diodes (LEDs). The LEDs may be configured to emit light in the visible range. In some embodiments, the illumination modules may comprise one or more of bar lights, ring lights, and row of lights. In some embodiments, the illumination modules may comprise illumination devices for primary and secondary optics measurements. In some embodiments, LEDs can be configured to emit light outside of the visible range (e.g., electromagnetic radiation having a wavelength in the range of about 400 nanometers (nm) to about 700 nm). In some embodiments, the illumination modules can comprise one or more of a fluorescent illumination, quartz halogen illumination, metal halide illumination, xenon illumination, and/or high pressure sodium illumination.

The plurality of illumination modules may be illuminated individually in sequence such that one or more images of the document or document stack can be captured when each individual illumination module is illuminated. The illumination modules may be illuminated in any sequence. In some embodiments, the illumination modules may be illuminated in a clockwise order. In some embodiments, the illumination modules may be illumination in a counterclockwise order. Sequential illumination of the modules may be manually set and/or automatically selected, such as based on one or more system parameters and/or characteristics of the documents being processed. The rate at which the illumination modules are activated in sequence can be selected to increase throughput of the system 200 while allowing sufficient time for the image capturing device 230 to image the document or document stack. The rate at which the illumination modules are illuminated may be less than any of the values described herein, greater than any of the values described herein, or falling within a range between any two of the values described herein. In some embodiments, the rate at which the illumination modules are illuminated is faster than rate which can be perceived by the human eye. The rate at which the illumination modules are activated can be selected based on one or more parameters of the image capture device 240, such as the speed at which the image capture device can capture an image, including for example an exposure time of the image capture device. For example, the rate of illumination can be selected based on the exposure time of a digital camera. The rate of illumination can be selected to be at least as long as the exposure time of the digital camera. In some embodiments, each illumination modules can be illuminated for a duration of greater than about 0.1 milli-seconds (msec), about 0.2 msec, about 0.5 msec, about 1 msec, about 5 msec, or about 10 msec. In some embodiments, each illumination module can be illuminated for a duration of about 0.1 msec to about 20 sec, about 1 sec to about 15 sec, about 5 sec to about 10 sec.

The image capturing device 230 can be positioned above the pedestal 250 such that images of the document or document stack on the pedestal 250 can be captured without any obstructions. In some embodiments, the image capturing device 230 can be positioned such that its shadow is not cast upon the document or document stack when any of the illumination modules, such as the illumination modules 212, 214, 216 and 218 are activated. In some embodiments, the image capturing device 230 is positioned above each of the illumination modules. In some embodiments, the image capturing device 230 is equidistant or substantially equidistant to each of the illumination modules.

In some embodiments, the image capture device 230 is a digital camera. In some embodiments, the image capture device 230 is a 5-megapixel digital camera. The camera can have resolution values other than 5 megapixels. The camera can have lower or higher resolution, such as about 3-megapixels, about 8-megapixels, or about 12 megapixels. The resolution of the digital camera can be selected to provide capture of desired features on the document or document stack being processed. In some embodiments, the image capturing device 230 can be another type of imaging device selected based on the type of illumination source 210 used.

The image capture device 230 can be configured to capture one or more images of a document or document stack on the pedestal 250 each time the document or document stack is being illuminated by each of a plurality of illumination modules, such as the plurality of illumination modules 212, 214, 216 and 218. As described herein, the plurality of illumination modules positioned at different locations can be activated in sequence such that images of the document or document stack can be captured while being illuminated from different angles. The captured images can be transmitted from the image capture device to the controller 202 for analysis, for example such that a boundary of a document, and/or one or more features of a fastener can be identified.

As described herein, the controller 202 may comprise a memory configured to store the information from the image capture device 210 and/or one or more algorithms used to process the information. For example, machine readable instructions for executing processing of the information may be stored in the memory. The controller may comprise a processor configured to process the captured images from the capture device, for example to execute a sequence of machine-readable instructions to analyze the captured images.

In some embodiments, the analysis performed by the controller comprises comparing the images of the document or document stack captured by the capture device to identify any shadows in the images. For example, the controller can be configured to perform a comparison between the images to detect any changes in the images, such as a pixel-by-pixel comparison, to identify the presence of any shadows. Shadows may be cast by one or more edges of a document or document stack onto the upper surface 252 of the pedestal, and/or onto one or more documents and/or document stacks beneath the document or document stack being processed. Shadows may be cast by one or more fasteners on the document or document stack. For example, the controller can be configured to generate a shadow profile of the document or document stack using the captured images.

In some embodiments, the controller 202 can be configured to determine one or more characteristics of the document, document stack and/or any fasteners on the document or document stack based on the shadow profile. A size, shape, orientation, and/or thickness of a document or document stack can be determined using the shadow profile. In some embodiments, the shadow profile can be used to identify a boundary of a document, such as a single sheet of paper. In some embodiments, the shadow profile can be used to determine the type of fastener on the document or document stack being processed. In some embodiments, the shadow profile can be used to determine a location and/or orientation of the fastener on the document or document stack.

The controller 202 can be configured to make one or more determinations regarding the document, document stack and/or fastener using one or more algorithms stored therein, including one or more pattern recognition algorithms. For example, the shadow profiles generated by the controller can be compared to one or more known and/or reference patterns to determine a size, shape, orientation, and/or thickness of a document, and/or a type, location and/or orientation of a fastener. In some embodiments, the controller can be configured to use the shadow profiles to determine which features in an image are three-dimensional features. In some embodiments, the controller can be configured to determine which of the three-dimensional features present correspond to a boundary of a document and/or an actual fastener on the document or document stack. The controller may be configured to disregard the three-dimensional features which are not actual documents and/or fasteners. For example, the controller can be configured to process information gathered by the image capture device 230 using one or more algorithms stored in a memory of the controller to determine whether shadows present in the images are shadows cast by features of a document of interest and/or an actual fastener. The controller can generate instruction signals for controlling one or more components of the system to manipulate the document or document stack and/or fastener to remove the fastener based on the analysis of which three-dimensional features are features of a boundary of a document, and/or features of an actual fastener. The controller may use one or more pattern recognition algorithms to perform one or more analyses described herein. In some embodiments, shadows present in the images captured by the image capture device can be compared to one or more thresholds and/or references, including known reference patterns, such as known reference patterns of known fasteners and/or portions of fasteners, and/or patterns of flexible material and/or portions of flexible material. The controller can be configured to determine whether an actual fastener is present, boundary of the document, and/or orientation and/or position of the document and/or fastener, using the comparison. In some embodiments, one or more of the analysis is performed by a controller remote from the system 200 and that analysis which is performed remotely is transmitted to the controller 202 for controlling one or more components of the system, such by one or more wired and/or wireless networks as described herein. For example, the remote controller can at a different location in the facility at which the system 200 is located, or at a facility different from that of the system 200.

As described in further details herein, the controller 202 can be configured to send instructions to one or more of the robot arm 240, document pedestal 250, first document platform 260, and second document platform 270 to manipulate the document or document stack and/or any fasteners on the document or document stack.

Referring again to FIG. 2, as described herein, the system 200 can include a robot arm 240 comprising one or more tools (not shown) configured to manipulate the document or document stack and/or a fastener, such as one or more end effectors. The one more end effectors can be configured to be detachably coupled to the robot arm, such as at a distal portion 242 of the robot arm. The controller 202 can be configured to send instructions to the robot arm to control movement of the robot arm and/or the one or more end effectors coupled to the robot arm. For example, the controller can be configured to instruct the robot arm to attach to one or more end effectors appropriate for a desired task. The desired task can be selected based at least in part on the determination made regarding the size, shape, orientation, and/or thickness of a document or document stack, and/or a type, location and/or orientation of any fasteners on the document or document stack, as described herein. After the task is completed, the controller can instruct the robot arm to release the one or more end effectors, such as to place the one or more end effectors in a storage component of the system.

As will be described in further details herein, in some embodiments, the robot arm 240 can be configured to be releasably coupled to a document transfer end effector and/or a fastener removal end effector. The controller 202 can be configured to send instructions to the robot arm regarding which end effector to use based on the determination made regarding the size, shape, orientation, and/or thickness of a document or document stack, and/or a type, location and/or orientation of any fasteners on the document or document stack.

The system 200 can comprise one or more end effector storage components configured to store the end effectors. End effectors not being used by the robot arm 240 may be stored. For example, the robot arm 240 may perform a task using a first end effector and subsequently, after completion of the task, move to the end effector storage to release the first end effector, such as positioning the first end effector at a preset location within the end effector storage. The robot arm may then retrieve a second end effector from the end effector storage to perform a second task. The first and second end effectors may comprise one or more end effectors configured to manipulate a document, document stack, and/or fastener. The robot arm can subsequently return the second end effector to the storage once the second task has been completed. This process can be repeated until the desired manipulation of the document or document stack is completed, such as the removal of all fasteners from the document or document stack. For example, the robot arm may first retrieve a document transfer end effector to separate the document or document from other document(s) and/or document stack(s) on the pedestal 250. After separation is complete, the robot arm can be instructed by the controller 202 to return the document transfer end effector to the storage area. The controller may then instruct the robot arm to couple to a fastener removal end effector to remove a fastener from the document or document stack. The fastener removal end effector can be selected based on the information collected regarding the fastener. The controller can instruct the robot arm to return the fastener removal end effector after the fastener removal step is completed.

In some embodiments, the controller 202 can be configured to control one or more of the first document platform 260 and the second document platform 270 for manipulating a document or document stack being processed by the system 200. The first and/or second platforms can be used in combination with a robot arm 240. In some embodiments, the controller can be configured to instruct the first document platform and second document platform to lift and/or separate the document or document stack from any other document(s) or document stack(s) on the pedestal 250, such as in combination with one or more end effectors coupled to the robot arm. For example, an end effector coupled to the robot arm can be used to lift a document or document stack from the pedestal, such as by using a suction force placed over at least a portion of the document or document stack. One of the first document platform or the second document platform can be moved to be subsequently positioned underneath the document or document stack lifted by the end effector on the robot arm. In some embodiments, positioning of a document platform under the document or document stack may facilitate separation of the document or document stack from any other document(s) or document stack(s) on the pedestal. In some embodiments, the document or document stack can remain on the first document platform when a fastener attached thereto is removed. For example, the document or document stack can remain on the first document platform while a fastener is removed using one or more end effectors coupled to the robot arm.

In some embodiments, both the first document platform 260 or the second document platform 270 can be used to manipulate the document or document stack on the pedestal 250, such as to flip the document or document stack over. The document or document stack may be flipped over to facilitate removal of one or more fasteners attached thereto. A fastener on the document or documents stack, such as a staple, may be in an inverted position. An inverted staple may have a bridging portion (e.g., a crown) between its two leg portions on a bottom surface of the document or document stack. For example, the bridging portion may be oriented towards the upper surface 252 of the pedestal 250 while its two leg portions are oriented away from the upper surface, such as towards the illumination source 210 above the pedestal. The document or document stack may be flipper over to facilitate removal of the inverted staple, such that the bridging portion between its two legs is oriented towards the illumination source. The document or document stack can be flipped over such that the bridging portion is facing upwards toward the illumination source. The document or document stack can be flipped by first moving one of the first document platform or the second document platform to be positioned under the document or document stack, then moving the other of the first document platform or second document platform over the document or document stack to sandwich the document or document stack between the two platforms. The two document platforms can be rotated around a horizontal axis to flip over the document or document stack between the two document platforms. For example, the two platforms can simultaneously contact the document or document stack to securely position the document or document stack between the two platforms such that document or document stack remains positioned between the two platforms as the two platforms are rotated. Pressure may be exerted upon the document or document stack by both of the platforms to ensure the document or document stack does not slip from between the platforms when the platforms are rotated.

In some embodiments, one or more of the first document platform 260 or the second document platform 270 can be a multi-axis component, including for example a two-axis or a three-axis component.

The first and/or second document platforms 260, 270 may be sized to accommodate the document or document stack handled by the system 200. In some embodiments, each of the first and second document platforms may comprise a degree of roughness on a surface such that the surface configured to be in contact with the document or document stack can have desired friction with the document or document stack. Providing a desired degree of friction on one or more surfaces of the first and/or second platforms may facilitate manipulation of the document or document stack, and/or removal of one or more fasteners from the document or document stack. As described herein, it may be advantageous to maintain or substantially maintain the document or document stack in a desired position on one of the first or second platforms, such as during removal of one or more fasteners from the document of document stack. Maintaining or substantially maintaining the document or document stack in a desired position on a document platform can enable successful removal of the fasteners. It may be desired to securely position the document or document stack between the two platforms, such as when rotating the two platforms to flip the document or document over. The desired friction can be achieved using various techniques. For example, friction can be provided on a surface of one or both of the platforms configured to contact the document or document stack by features formed thereon, including for example various recess patterns etched into the surface. In some embodiments, the surface can have a coating to provide the desired friction. In some embodiments, a material of the platform can be selected to provide the desired friction. In some embodiments, friction can be provided by placing additional material on the surface, such as strips of material configured to provide added friction. In some embodiments, a surface on one or both of the platforms configured to contact the document or document stack can have a coefficient of friction of greater than about 0.5, about 0.6 or about 0.7. In some embodiments, the coefficient of friction can be about 0.5 to about 1, including about 0.6 to about 1, or about 0.7 to about 1.

In some embodiments, the document and fastener identification system 200 can be configured to process a document or document stack having a fastener attached thereto, such as from initiating illumination of the document or document stack to completing removal of the fastener, in less than about 15 seconds (sec), about 10 sec, about 5 sec, or about 3 sec. In some embodiments, the process can be about 3 sec to about 15 sec, including about 3 to about 10 sec, about 5 sec to about 15 sec or about 10 sec to about 15 sec. For example, the processes can be an automated process. The process may not include operator input after the document or document stack is positioned on the pedestal 250, at an input of the system, or after illumination process of the document or document stack has initiated. In some embodiments, the system can be configured to process a document or document stack having an inverted fastener attached thereto, such as such as from initiating illumination of the document or document stack to completing removal of the fastener, in less than about 20 seconds (sec), about 15 sec, about 10 sec, or about 5 sec. In some embodiments, the process can be about 5 sec to about 20 sec, including about 5 to about 15 sec. For example, the processes can be an automated process. The process may not include operator input after the document or document stack is positioned on the pedestal, at an input of the system, or after illumination process of the document or document stack has initiated.

Only one robot arm 240 is shown in FIG. 2. In some embodiments, use of a single robot arm can reduce the footprint of the document and fastener identification system 200, reduce costs of operation and/or maintenance, and/or reduce sources of possible malfunction to thereby increase system reliance. However, it will be understood that in some embodiments a system for identifying a single document and/or fastener attached to a document or document stack, and/or removal of the fastener, can include more than one robot arm. In some embodiments, multiple robot arms can be included. Various tools, such as end effectors, can be coupled to the robot arms to manipulate the document and/or fastener, including for example, to remove the fastener. In some embodiments, such a system can include one or more robot arms for manipulating the document or document stack and one or more other robot arms to manipulate a fastener on the document or document stack.

Figures 3A, 3B:
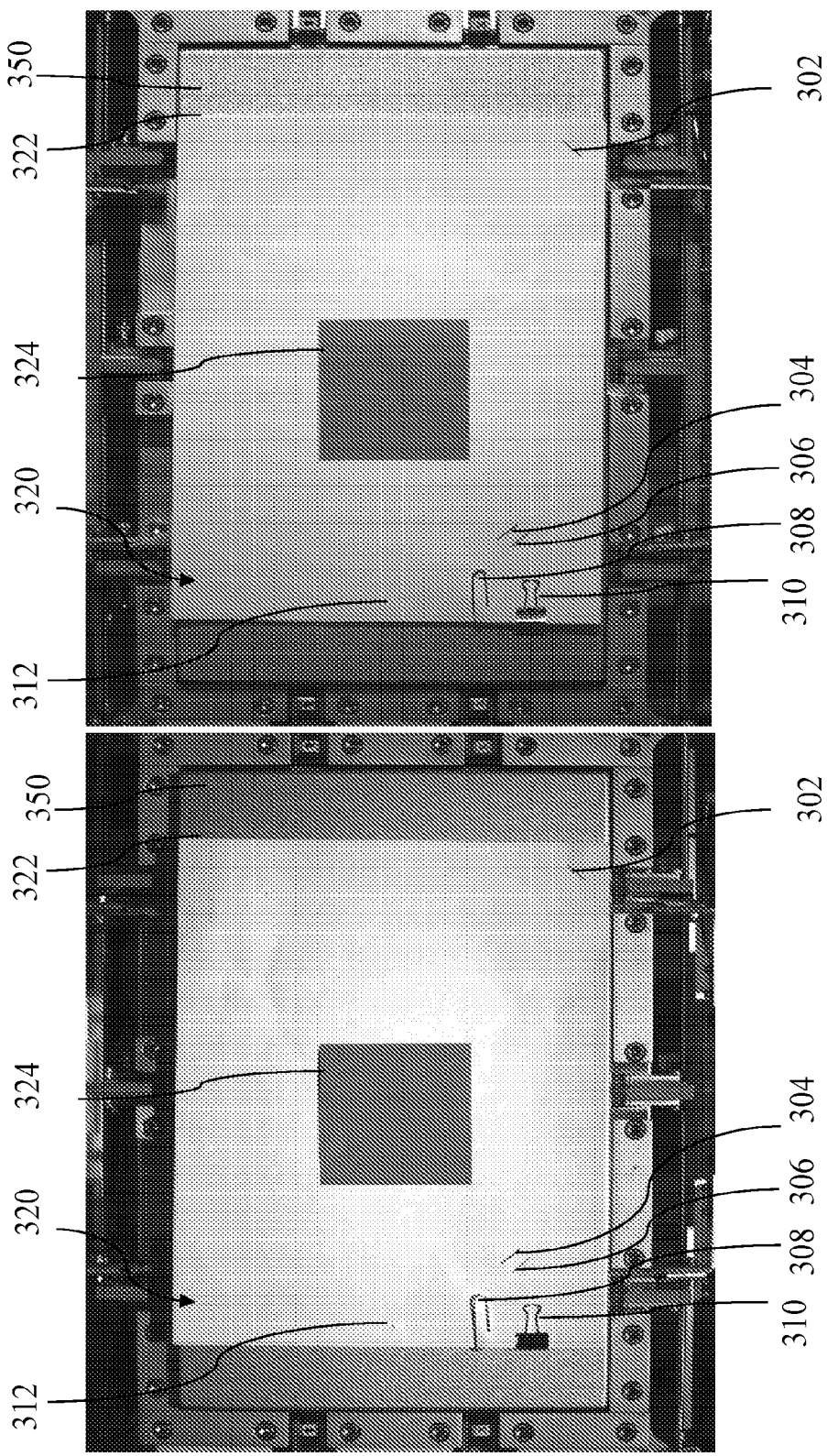
Figure 3E:
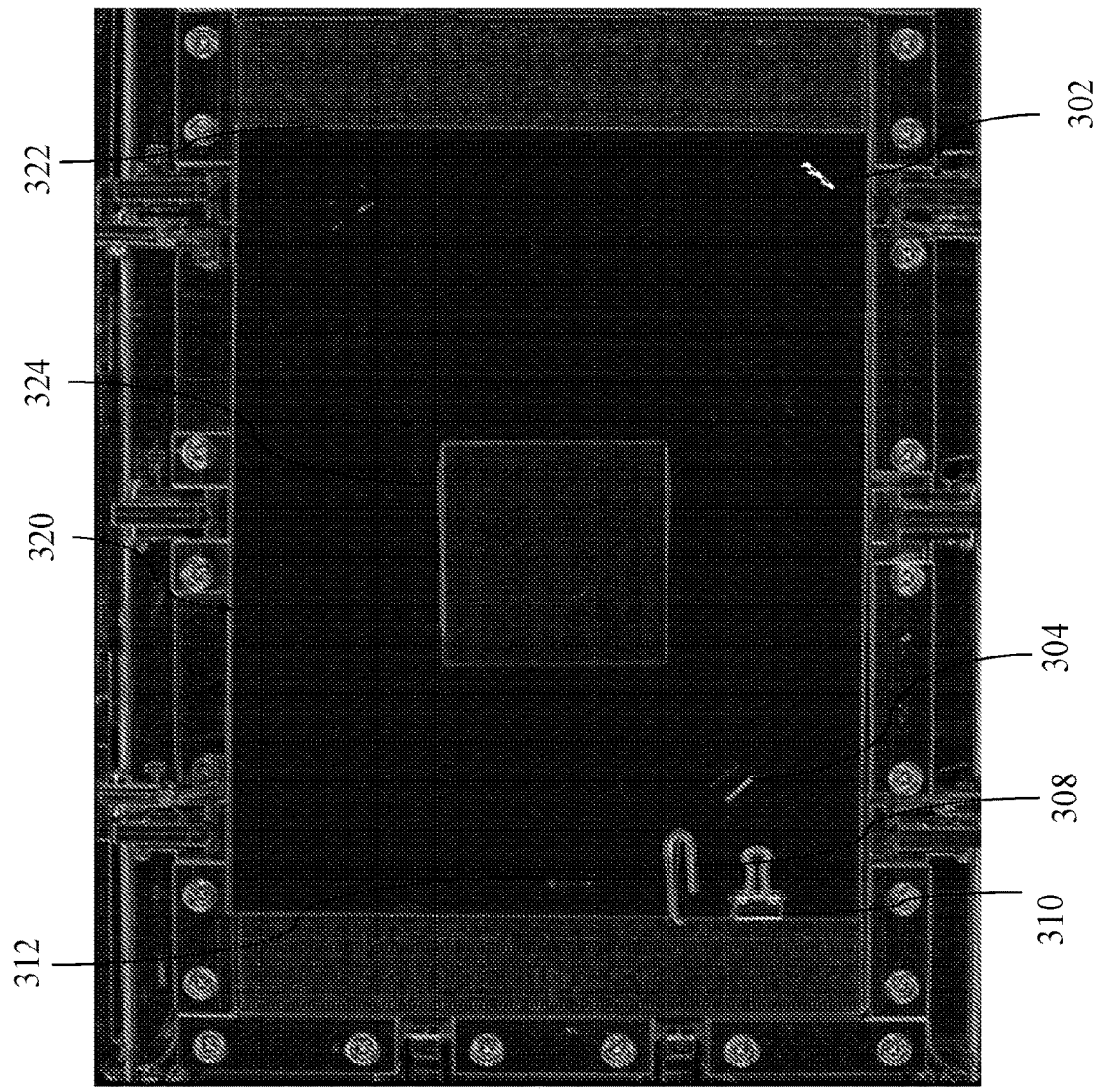

FIGS. 3A through 3D are examples of unprocessed image captured by an imaging device of document and fastener identification system, such as the document and fastener identification system 200 of FIG. 2. Meanwhile, FIG. 3E is an example of a processed image generated by the document and fastener identification system, for example using information of the unprocessed image of FIGS. 3A through 3D. The plurality of unprocessed images of FIGS. 3A through 3E of the document stack captured while the document stack is illuminated by illumination modules at different locations relative to the document stack can be used to generate the processed image shown in FIG. 3E. The unprocessed images of FIG. 3D can be the image as captured by a digital camera. The processed image of FIG. 3E can be an image generated by the document and identification system, and shows features which are determined to be three-dimensional features, such as the physical fasteners and/or edges of one or more documents in the document stack, as identified by the document and fastener identification system.

One or more photometric stereovision algorithms can be used to process the information from the unprocessed images, including for example using various pattern recognition algorithms one skilled in the art would understand to be applicable. As described herein, a shadow profile of the document stack can be generated by comparing the unprocessed images captured by the image capture device. For example, the comparison can be made to determine whether any 3-D features are present in the image, as 3-D features can cast shadows onto a surface of the document stack and/or a pedestal on which the document stack is positioned. For example, FIG. 3E can be generated by determining which features are actual three-dimensional features in the images. In some embodiments, information included in the processed image, such as the image of FIG. 3E, can be further processed by the system to determine which of the three-dimensional features are actual fasteners and/or boundaries of documents, such that the fasteners and/or documents can be properly manipulated. In some embodiments, one or more photometric stereovision algorithms can comprise algorithm configured to recognize shadow profiles of various types of flexible material as described herein, such as various types of paper. The one or more photometric stereovision algorithms may be configured to recognize various types of fasteners, including for example, various types of staples described herein. The one or more photometric stereovision algorithms may be configured to recognize a position and/or an orientation of the fastener and/or flexible material. In some embodiments, a processed image comprises an image which shows the actual fasteners and/or document or document stack, for example without showing other three-dimensional features which are not actual fasteners and/or a boundary of the document and/or document stack.

In FIGS. 3A through 3D, the unprocessed images show a document 320 is shown positioned on a pedestal 350. The document 320 can include a first boundary comprising outer edges 322 and a second boundary comprising inner edges 324. The images show presence the appearance of a first staple 302, a second staple 304, a third staple 306, a paper clip 308, a binder clip 310 on the document 320. The images also show a pair of holes 312 on the document 310. For example, the pair of holes 312 can be holes made by a staple which has been removed. Each of the FIGS. 3A through 3D are images captured of the document when the document is illuminated by illumination modules at different locations relative to the document.

FIG. 3E is a processed image generated by the document and identification system showing the three-dimensional features captured by the image capture device. In FIG. 3E, the second staple 304 is not shown in the processed image as the second staple is determined to not be a three-dimensional feature. For example, the second staple may be a photocopied staple. FIG. 3E shows the first staple 302, third staple 306, paper clip 308, binder clip 310, pair of holes 312 on the document 320, and the inner edges 324 and outer edges 322 of the document, as these features are determined to be three-dimensional features captured in the images. FIG. 3E shows the various positions, and/or orientations of the fasteners and edges of the document. The processed image may show features from the pedestal 350 which are three-dimensional. As described herein, the document and fastener identification system can be configured to further process the information shown in FIG. 3E. Information shown in FIG. 3E can be further processed, for example using one or more pattern recognition algorithms, to determine which of the three-dimensional features are part of a boundary of a document, and/or correspond to features of an actual fastener. The information can be processed to determine the type of the flexible material present, the type of the fastener present, and/or various other characteristics of the document and/or fastener present (e.g., position, and/or orientation). For example, the system can be configured to determine that the pair of holes is not part of an actual fastener on the document and the features of the pedestal 350 are not features on the document. In some embodiments, a controller of a document and fastener identification system can be configured to, in generating instructions signals for controlling one or more other components of the system for fastener removal, disregard information relating to three-dimensional features which do not correspond to a boundary of a document and/or do not correspond to a part of an actual fastener. For example, information relating to the pair of holes and the pedestal may be disregarded by the controller in determining control instructions for one or more other components of the system.

In some embodiments, the document and fastener identification system can use information generated by the document and fastener identification system relating to the documents and fasteners to provide instructions to one or robot arms for manipulating the documents and fasteners. For example, an appropriate tool, such as an end effector for coupling to the robot arm, can be selected, and movement of the robot arm can be controlled, to achieve desired movement of the papers and/or removal of the fasteners.

Figure 4:
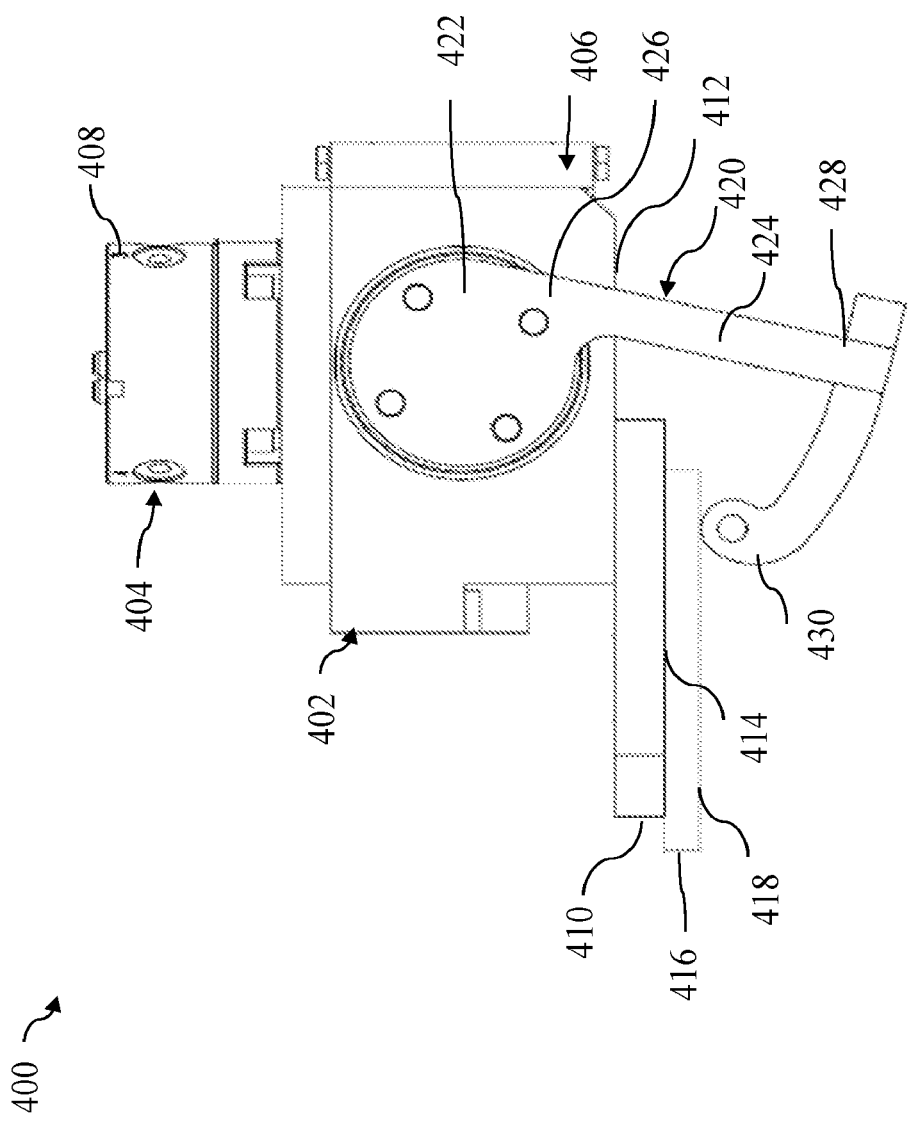
FIG. 4 is a schematic diagram of an example of document transfer end effector.

FIG. 4 is a schematic side view of an example of a document transfer end effector 400. The document transfer end effector 400 can a have a body 402 comprising a top portion 404 and a bottom portion 406. The top portion may comprise a robot coupling component 408 configured to releasably couple the document transfer end effector to a robot arm, such as the robot arm 240 described with reference to FIG. 2. The robot coupling component may comprise one or more of a number of mechanical coupling mechanisms (not shown) understood by a skilled artisan to enable releasable coupling between the document transfer end effector and a robot arm. The robot coupling component can be configured to allow quick release from and/or engagement with the robot arm to enable increased document processing speed. In some embodiments, the coupling component comprises one or more electrical interfaces (not shown) for transmission of electrical signals to and from the document transfer end effector, such as to and from the robot arm for control of one or more components of the document transfer end effector. The electrical interfaces may be configured to transfer control signals from a controller to the one or more components of the document transfer end effector, such as to control the movement of the components. The document transfer end effector can be stored at an end effector storage on one or more document and fastener identification systems described herein when the document transfer end effector is not in use.

The lower portion 406 may comprise a suction applicator 410 configured to lift at least a portion of a document or a document stack. The suction applicator may be configured to apply sufficient suction force upon a portion of the document or document stack positioned on a document pedestal, such as the pedestal 208 described with reference to FIG. 2, such that the document or document stack can be lifted and separated from any other document(s) and/or document stack(s) on the pedestal. For example, the suction applicator may comprise a suction cup.

The suction applicator 410 may extend from a lower surface 412 of the document transfer end effector body 402. The suction force exerted by the suction applicator 410 may be selected to allow lifting of one document or document stack without lifting other document(s) or document stack(s) on the pedestal to allow separation of the document or document stack from the other document(s) or document stack(s). The suction force applied by the suction applicator can be configured to lift one document and/or a plurality of documents. In some embodiments, information collected by a document and identification system regarding a document or document stack can be used to determine the suction force applied, for example based on a number of documents in the document stack.

To apply the suction force upon the document or document, the document transfer end effector 400 can be brought proximate to the document or document stack such that the suction applicator 410 can contact the document or document stack. A lower surface 414 of the suction applicator can be brought into contact with the document or document stack such that desired suction force can be applied to the document or document stack. The suction applicator can be configured to contact the document or document stack proximate to and/or at one or more identified fasteners. In some embodiments, the suction applicator contacts at least a portion of the document or document stack to lift the document or document stack, such as a portion of the document or document stack proximate to or at the identified fastener. For example, the document or document stack can be lifted by the document transfer end effector due to suction force applied to a corner of the document or document stack. One or more fasteners, such as a staple, may be attached to the document or document stack at the corner. Positioning of the suction applicator at a desired location on the document or document stack can be achieved using information collected regarding the document or document stack. For example, a controller of a document and fastener identification system can be configured to use the collected information collected to control movement of the robot arm to which the document transfer end effector is coupled and/or the document transfer end effector itself to make desired contact between the document transfer end effector and the document or document stack.

In some embodiments, the suction applicator 410 can be extended and/or retracted relative to the body 402 to facilitate contact between the suction applicator and the document or document stack. For example, the suction applicator can be extended away from the body to bring the suction applicator closer to the document or document stack, and the suction applicator can be retracted back towards the body after the suction applicator is no longer needed.

Referring to FIG. 4, the document transfer end effector 400 can comprise a document pincher 420 configured to facilitate lifting of the document or document stack from a document pedestal and/or transfer of the document or document stack to a different location. As described herein, a document or document stack can be transferred onto a document platform for removal of any fasteners attached thereto. The document pincher can include a rotatable coupling 422 for rotatably coupling the pincher to the document transfer end effector body 402. The document pincher can include an arm 424 extending from the rotatable coupling. The arm can have a first end 426 coupled to the rotatable coupling and a second end 428 comprising a document gripper 430 extending therefrom. The rotatable coupling can be rotated such that the arm is rotated relative to the body to bring the document griper towards or away from the body. The document gripper can be rotated towards the body to facilitate securing of the document or document stack against one or more portions of the document transfer end effector. For example, the suction applicator 410 can apply a suction force upon the document or document stack such that the document or document stack can be lifted. The arm of the document pincher can be rotated to bring the document gripper against towards the body such that the document or document stack can be positioned between the document gripper and one or more portions of the document transfer end effector. The document transfer end effector may comprise a document contact platform 416 against which the document or document stack can be positioned by the gripper. In some embodiments, the document transfer end effector comprises the contact platform. In some embodiments, the document contact platform 416 may extend from the lower surface 412 of the body. In some embodiments, the document or document stack can be pinched between the document gripper and the document contact platform, such as between the document gripper and the lower surface 418 of the document contact platform. In some embodiments, the document or document stack can be pinched between the document gripper and one or more other portions of the document transfer end effector, including one or more portions of the lower surface of the document transfer end effector body.

Use of the gripper 430 can advantageously provide secure lift of the document or document stack such that the document or document stack can be reliably separated from any other document(s) or document stack(s) over which the document or document stack is placed. Securing the document or document stack using the gripper provides an added level of reliability in the separation of the document or document stack, such as compared to a system using the suction applicator 410 without the gripper.

The document gripper 430 may comprise a variety of configurations suited to maintain the document or document stack against the body 402 of the document transfer end effector 400. In some embodiments, the document gripper comprises a rod. For example, at least a portion of the document gripper may comprise a rod. In some embodiments, the document gripper can comprise a different configuration, including for example a pad configuration having a flat surface oriented towards the body 402. The document gripper may have one or more configurations to maintain the document or document stack against the lower surface 412 of the body such that desired transfer of the document or document stack can be achieved. In some embodiments, the document gripper can be configured to maintain a hold on the document or document stack such that the document pincher can be used to both pick up the document or document stack from the pedestal and transfer the document or document stack to a platform. The document or document stack can be positioned on the platform when the fastener removal is performed.

The document gripper 430 may comprise at least a portion which is oriented at an angle of less than about 180° from the second end 428 of the arm 424. In some embodiments, the document gripper comprises at least a portion which is oriented at an angle of about 90° from the second end of the arm. The document gripper 430 may extend partially across a dimension of the body 402, such as a width of the body. The document gripper may extend across an entire or substantially entire dimension of the body. In some embodiments, the document gripper comprising a rod which extends perpendicularly or substantially perpendicularly from the second end of the arm. In some embodiments, the rod may extend across an entire or substantially entire width of the body. For example, the rod may be coupled to the body via two arms and two rotatable couplings 422, each arm and rotatable coupling on opposing portions of the body. In some embodiments, a rod extending across an entire or substantially entire width of the body may be coupled to the body via one arm and one rotatable coupling. In some embodiments, the rod may be perpendicular or substantially perpendicular to the arm and extend partially along a width of the body.

Figure 5:
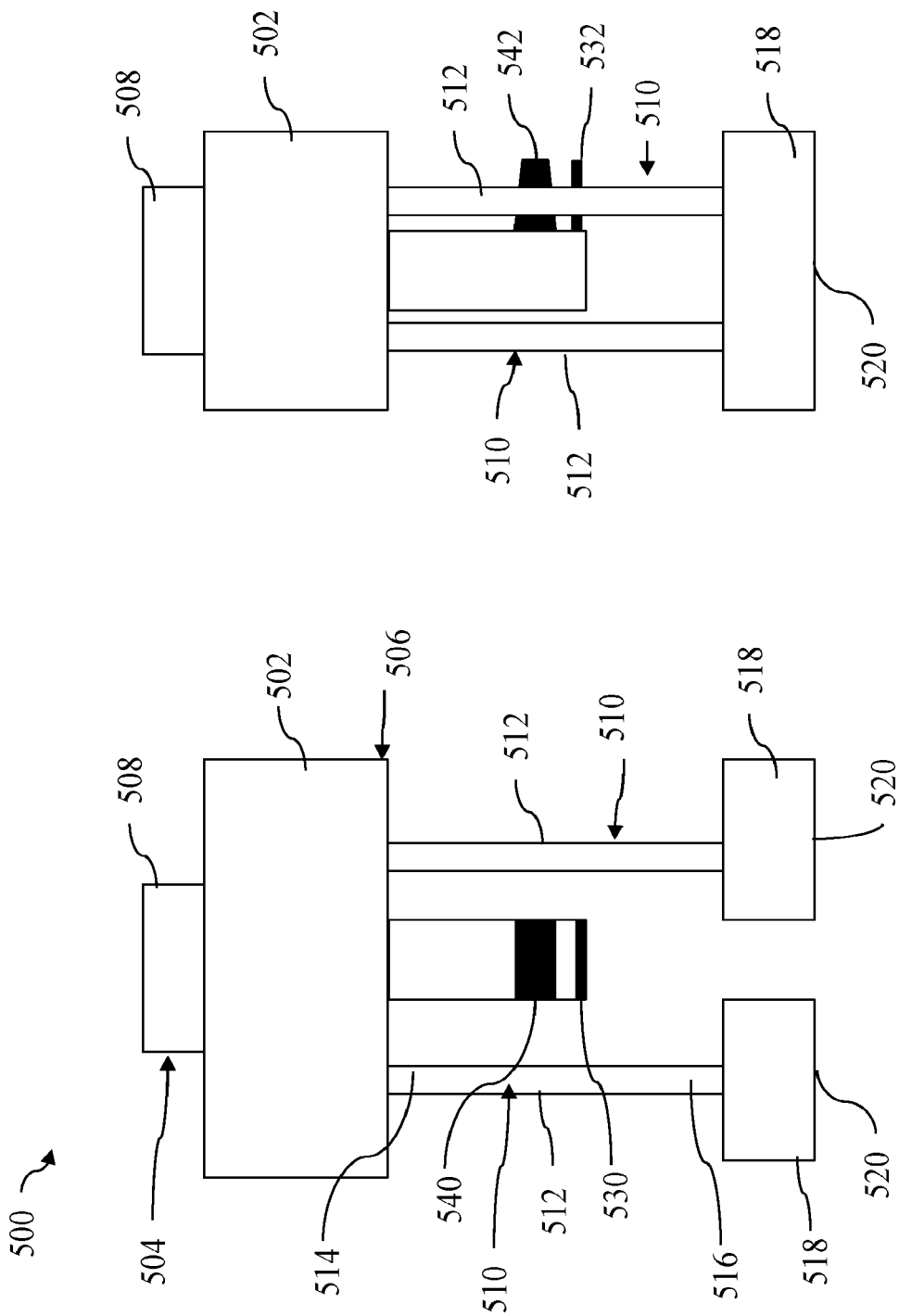
FIGS. 5A and 5B are schematic diagrams of the front view and side view, respectively, of an example of a fastener removal end effector.

FIGS. 5A and 5B are schematic diagrams of an example of a fastener removal end effector 500. The fastener removal end effector may be configured to remove a staple from a document stack. The fastener removal end effector may be coupled to a robot arm, such as a robot arm 240 described with reference to FIG. 2. FIG. 5A is front view of the fastener removal end effector and FIG. 5B is a side view of the fastener removal end effector. Referring FIG. 5A, the fastener removal end effector can have a body 502 comprising a top portion 504 and a bottom portion 506. The top portion may comprise a robot coupling component 508 configured to releasably couple the fastener removal end effector to a robot arm, such as the robot arm described with reference to FIG. 2. The robot coupling component may comprise one or more of a number of coupling mechanisms understood by a skilled artisan to enable releasable coupling between the fastener removal end effector and a robot arm. For example, the robot coupling component 508 can have one or more features of the robot coupling component 408 described with reference to FIG. 4. The robot coupling component can be configured to allow quick release from and/or engagement with the robot arm to enable increased document processing speed, such that the robot arm can switch between different end effectors based on the task to be completed. In some embodiments, the coupling component comprises one or more electrical interfaces (not shown) for transmission of electrical signals to and from the fastener removal end effector, such as to and from the robot arm for control of one or more components of the fastener removal end effector.

The fastener removal end effector 500 can include a first and a second foot structure 510, a fastener removal insert 530 and a fastener pincher 540. The first and second foot structure, fastener removal insert and fastener pincher can extend from the lower portion 506 of the body 502. The fastener removal insert can be positioned below the fastener pincher. The fastener removal insert and the fastener pincher can extend from a center or substantially a center portion of the body. The first and second foot structure can be positioned on both sides of the fastener removal insert and the fastener pincher. In some embodiments, the first foot structure and the second foot structure can be used to contact a document or document stack such that the document or document stack is firmly held against a surface upon which the document or document stack is placed. The fastener removal insert can be inserted between a fastener attached to the document or document stack, such as a staple. The fastener pincher can be positioned against the fastener removal insert to firmly grip the fastener between the fastener pincher and the fastener removal insert. The fastener pincher and removal insert may then be moved away from the document or document stack while the first and second foot structures hold the document or document stack against the surface upon which the document or document stack rests such that the fastener can be removed therefrom. For example, the fastener pincher and removal insert may then be moved away from the document or document stack such that a staple on the document or document stack can be pulled out.

Referring to FIG. 5A, the first and second foot structures 510 can each comprise a pair of elongate portions 512 which extends from the body 502. The side view in FIG. 5B of the fastener removal end effector 500 shows the pair of elongate portions for one of the first or second foot structure. The elongate portions can each have a first end 514 proximate to the body and a second opposing end 516 away from the body. The second opposing ends of the foot structures can be coupled to respective document contacting portions 518. The elongate portions can be extended away from the body to bring the document contacting portions into contact with the document or document stack, and can be retracted towards the body to release the document or document stack. For example, the elongate portions can be extended such that the document or document stack can be firmly held in place between a bottom surface of the contacting portions and the surface on which the document or document stack is resting. In some embodiments, the first and second foot structures can be spring-loaded.

The document contacting portions 518 can have various configurations to provide desired contact between the document contacting portions and the document or document stack such that the document and document stack can be held firmly in place while the fastener is removed therefrom. In some embodiments, the contacting portions can comprise a document contacting surface 520 oriented away from the body 502 and towards the document or document stack. As shown in FIG. 5B, in some embodiments, a contacting portion can be coupled to both elongate portions 512 of the foot structure 510. The contacting portion may comprise a rectangular or substantially rectangular configuration. For example, the document contacting surface can have a rectangular or substantially rectangular shape. In some embodiments, the contacting surface can have a length the same or substantially the same as a corresponding dimension of the body, for example extending the entire or substantially entire corresponding length of the body. In some embodiments, the document contacting surface can have one or more other shapes, such as a shape comprising a curved edge.

The fastener removal insert 530 can comprise a tab 532 having a configuration suited for inserting between the fastener and the document or document stack. For example, the tab can be configured for insertion between a staple and the document or document stack. In some embodiments, the tab can comprise a thin flat protrusion. The fastener removal insert can be moved relative to the document or document stack such that at least a portion of the tab is inserted between the fastener and the document or document stack. In some embodiments, the tab can comprise at least a portion which has a thickness less than about 3 millimeters (mm) in thickness, including less than about 2 mm, or about 1 mm. In some embodiments, the tab can comprise a portion having the same or substantially the same width as a width of the portion of the fastener under which the portion of the tab is inserted. In some embodiments, the tab can have a width greater than about 50% of a corresponding dimension of the fastener, including greater than about 55%, about 60%, about 70%, about 80%, about 90% or about 95%. For example, the tab can have a width that is greater than about 95% the width of the portion of the fastener under which the tab is inserted. For example, the tab can be configured to be inserted under a portion of a staple, and the portion of the tab configured to be inserted underneath the staple can have a width greater than about 95% of the portion of the staple. In some embodiments, the tab can have a width such that the tab is in contact with two ends of the staple extending into the document or document stack when the tab is inserted between the staple and the document or document stack. In some embodiments, using a tab comprising a portion with a width similar to that of a corresponding width of the fastener can facilitate desired removal of the fastener. For example, using a tab comprising a portion with a width similar to that of a corresponding width of staple, such as the crown of the staple, may facilitate removal of the staple without breaking the staple. The staple may be removed without breaking off any portion of the staple which extends into the document or document stack.

The fastener pincher 540 may have a fastener gripper 542 configured to be in contact with the fastener. For example, the fastener gripper can be moved such that it contacts the fastener once the tab 532 of the fastener removal insert 530 is inserted between the fastener and the document or document insert. The fastener gripper can have a variety of configurations suited for making firm contact with the fastener, including a planar or substantially planar surface configured to contact a corresponding surface of the fastener. In some embodiments, the portion of the fastener gripper in contact with the fastener can have a dimension the same as or similar to a corresponding dimension of the fastener. In some embodiments, the portion of the fastener gripper in contact with the fastener can have a width greater than about 50% of a corresponding dimension of the fastener, including greater than about 55%, about 60%, about 70%, about 80%, about 90% or about 95%. For example, the portion of the fastener gripper can have a width that is greater than about 95% the width of the portion of the fastener with which the gripper is in contact. In some embodiments, using a gripper comprising a portion with a width similar to that of a corresponding width of the fastener can facilitate desired removal of the fastener. For example, using a gripper comprising a portion with a width similar to that of a corresponding width of staple, such as a width of the crown of the staple, may facilitate removal of the staple without breaking the staple. The staple may be removed without breaking off any portion of the staple which extends into the document or document stack.

In some embodiments, a portion of the fastener, such as the crown of a staple, can be firmly sandwiched between the fastener removal insert 530 and the fastener pincher 540. For example, the crown of a staple can be securely squeezed by the fastener removal tab 532 and the fastener gripper 542, including a fastener removal tab and fastener gripper having a similar or same width as the crown, such that movement of the fastener removal tab and the fastener gripper away from the document or document stack held in place by the document contacting portions 518 can remove the staple without or substantially without breaking the staple. For example, the entire staple can be removed without leaving any portion in the document or document stack. In some embodiments, firmly pinching the crown of the staple using the tab and the gripper facilitates removal of both legs of the staple from the document or document stack at the same or similar speed, thereby reducing or eliminating breakage of the staple during the removal process. Achieving such reliable removal of the staple can provide a document processing system which can demonstrate reduced errors, lowered operating costs, and/or involve decreased operator intervention.

Figure 6:
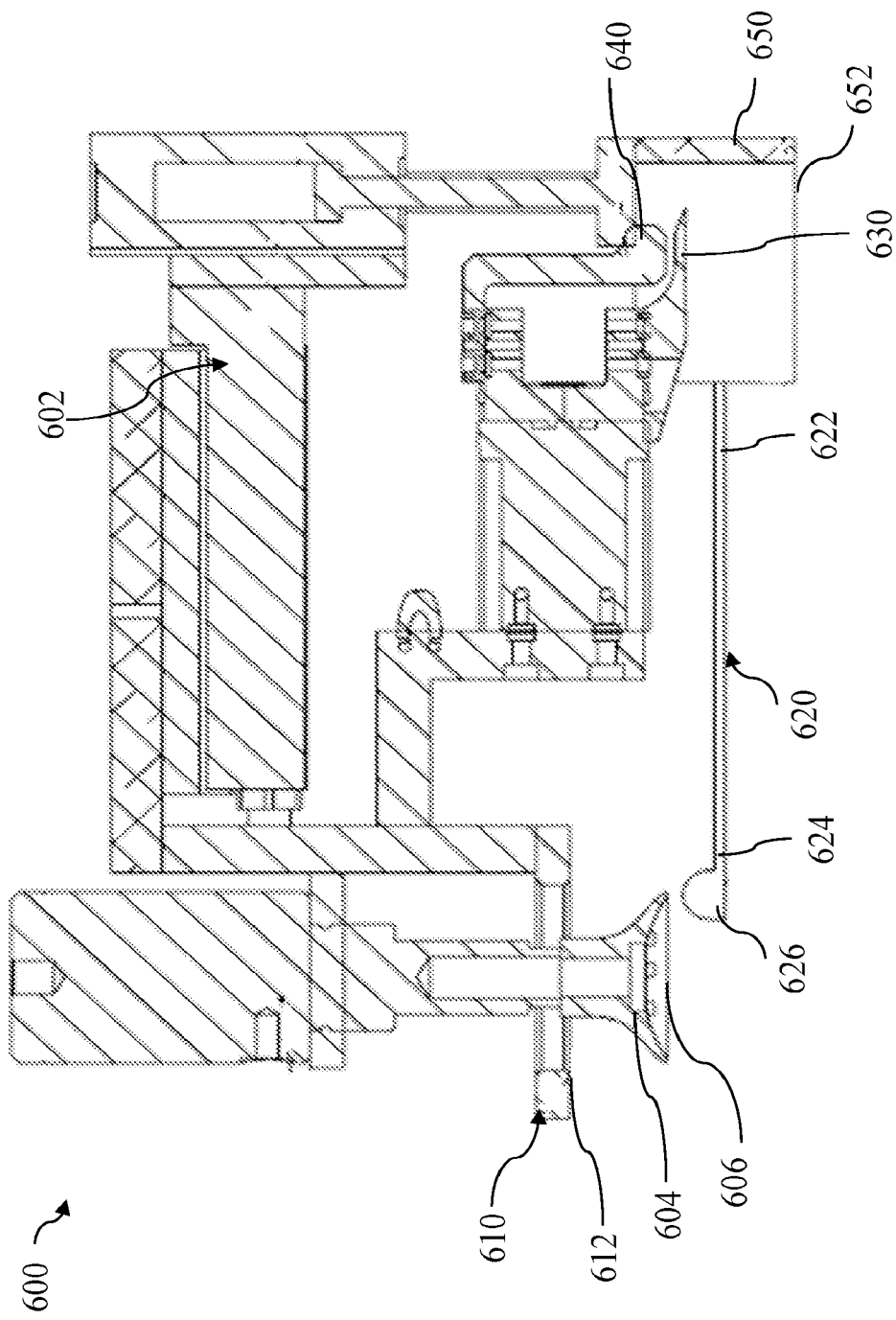
FIG. 6 is a schematic diagram of another example of an end effector.

FIG. 6 is a schematic cross-sectional view of an example of a multi-task end-effector 600. The multi-task end effector can be configured to perform both document transfer and fastener removal, such as the document transfer and fastener removal as described with reference to FIGS. 4 and 5. The multi-task end effector can be configured to include functionality of both the document transfer end effector 400 and the fastener removal end effector. In some embodiments, the multi-task end effector can be configured to remove a staple. For example, one or more components of the multi-task end effector for transferring a document or document stack can have one or more features of the document transfer end effector of FIG. 4. One or more components of the multi-task end effector for fastener removal can have one or more features of the fastener removal end effector of FIG. 5. A robot arm coupled to the multi-task end effector would not switch between different end effectors to achieve both the document transfer and fastener removal, thereby reducing process time used to retrieve and/or return an end effector.

The multi-task end-effector can have a body 602, a suction applicator 604, a document pincher 620, a document contacting platform 610, a fastener removal insert 630, a fastener pincher 640, and a document contacting leg 650. The multi-task end effector can comprise a coupling component (not shown) for coupling to a robot arm. The coupling component comprising one or more features as described herein, including for example one or more mechanical and/or electrical features for coupling to the robot arm. The document contacting platform can extend from the body. In some embodiments, the body comprises the document contacting platform. For example, a lower surface of the body comprises the lower surface 612 of the document contacting platform. The suction applicator can be moved toward a document or document stack, such as moving in a direction away from the document contacting platform and/or the body. The suction applicator can be moved such that a lower surface 606 of the suction applicator can contact the document or document stack to apply suction force upon the document or document stack. In some embodiments, as described herein, the suction force can be applied to one or more portions of the document or document stack proximate to or at a fastener. Sufficient suction force can be applied to lift the document or document stack, for example to separate the document or document stack from any other documents and/or documents on a pedestal of a system. The suction applicator can be retracted toward the body and/or a lower surface of the document contacting platform after suction force is applied to the document or document stack, bringing the document or document stack towards the body and/or document contacting platform.

The document pincher 620 can be subsequently actuated such that at least a portion of the document pincher is positioned below the lifted document or document stack such that the document or document stack can be securely positioned between the pincher and one or more other surfaces of the multi-task end effector. For example, the document pincher can comprise a first end 622 and a second end 624, the second end being proximate to the suction applicator. The document pincher can include a document gripper 626 coupled to the second end. The document gripper can be moved such that it is positioned under the lifted document or document stack to firmly position the document or document stack between the gripper and one or more of the lower surface 606 of the suction applicator 604, the lower surface 612 of the document contacting platform 610, and/or one or more other surfaces of the end effector, including one or more other surfaces of the body of the end effector.

After the document is transferred to a desired position, the fastener removal components of the multi-task end effector 600 can be used to remove one or more fasteners on the document or document stack. The multi-task end effector can include a fastener removal insert 630 for insertion between a fastener and a top surface of the document or document stack. For example, the fastener removal insert may comprise one or more components and/or dimensions as described herein for removal of staples. The multi-task end effector can include a fastener pincher 640 for positioning over and in contact with a fastener. For example, the fastener pincher may comprise one or more components and/or dimensions as described herein for removal of staples. The fastener removal insert and the fastener pincher may be configured to squeeze therebetween a fastener, such as a staple, such that movement of the fastener pincher and the fastener removal insert away from the document or document stack removes the fastener from the document or document stack. In some embodiments, the multi-task end effector comprises a document contacting leg 650 configured to be in contact with the document or document stack while the fastener is removed to facilitate holding the document or document stack in place for the removal. For example, the document contacting leg can comprise a lower surface 562 configured to be in contact with a top surface of the document or document stack during fastener removal. The document contacting leg can be configured to apply pressure to the document or document stack such that the document or document stack is securely sandwiched between the document contacting leg and a top surface of the pedestal on which the document or document stack is placed.

In some embodiments, the lower surface 652 of the document contacting leg 650 can have a shape configured to provide desired force upon the document or document stack. For example, the lower surface can have a "U" shape or substantially a "U" shape. In some embodiments, the document contacting leg can have a lower portion comprising a "U" shape or substantially a "U" shape. For example, the three sides of the U-shaped lower portion is placed proximate to the fastener to allow the fastener removal insert 630 and fastener pincher 640 to access the fastener within a space within the three sides, while the document contacting leg holds the document or document stack in place.

Figure 7:
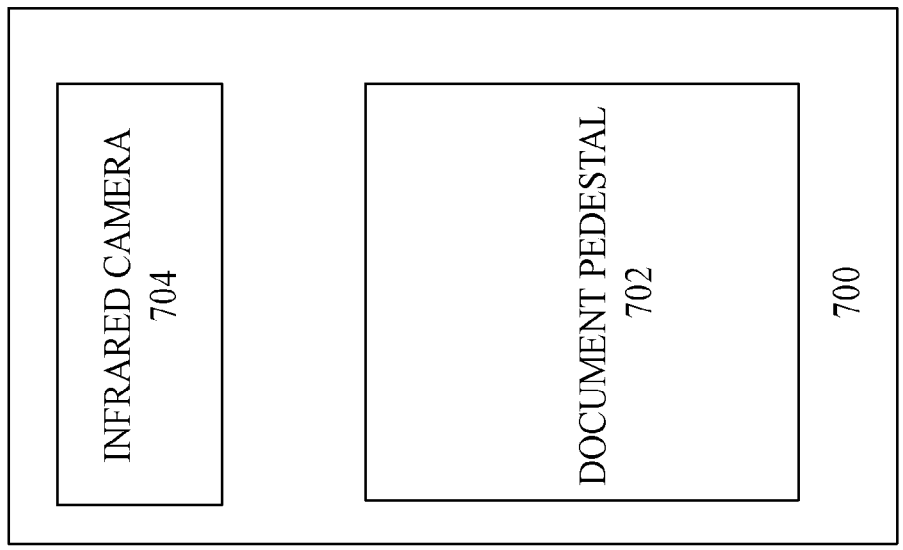
FIG. 7 is a schematic diagram of an example of an infrared fastener identification system.

FIG. 7 is a schematic diagram of an example of an infrared fastener identification system 700. The infrared fastener identification system can use the infrared energy from a fastener to identify its position and/or orientation on a document or document stack. The infrared fastener identification system can include a document pedestal 702 and an infrared camera 704. A document or document stack can be received on the document pedestal. The infrared camera can be used to capture the infrared energy of the document or document stack. The infrared energy image can be processed by the system to generate thermal energy information of the document or document stack, including thermal energy of one or more fasteners attached to the document or document stack.

The infrared camera 704 can be any number of infrared cameras one skilled in the art would understand as being suited for detection of fasteners. Thermal energy radiated by a fastener may be different from that of the document(s). The infrared camera can be configured to collect the thermal energy of a document or document stack being processed, including thermal energy of any fasteners attached thereto. The infrared fastener identification system 700 can be configured to use the difference in thermal energy between the flexible material of the document and the fastener to detect the presence of any fasteners and/or identify the type of fasteners present. The system can be configured to accurately quantify thermal energy of documents and/or fasteners that are processed to facilitate identification of any number of different types of fasteners that are attached to the documents being processed.

Figure 8:
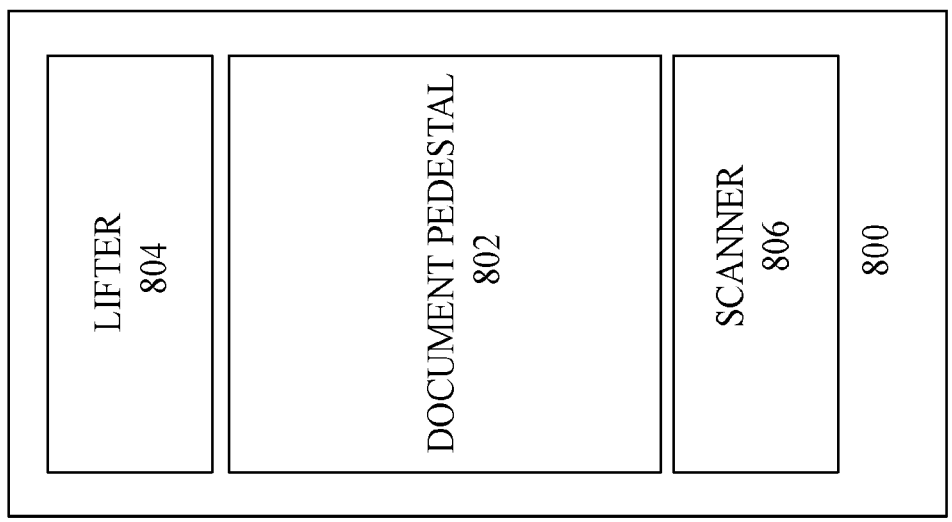
FIG. 8 is a schematic diagram of an example of a lift and scan fastener identification system.

FIG. 8 is a schematic diagram of an example of a lift and scan fastener identification system 800. The lift and scan fastener identification system can include a document pedestal 802, a lifter 804 and a scanner 806. The document or document stack to be processed can be received on the document pedestal. The lifter can be configured to lift the document or document stack up from the document pedestal. The lifter may be configured to lift the document or document stack using various techniques, including using various mechanical techniques. In some embodiments, the lifter can comprise a plurality of suction applicators configured to apply suction force upon the document or document stack. In some embodiments, the lifter comprises four suction applicators configured to be brought into contact with four different portions of a top surface of the document or document stack positioned on the pedestal. The four suction applicators can be used to lift the document or document stack. Subsequently, the scanner can be a used to scan for any obstruction in planes underneath the document, or a first document of the document stack, to identify the presence of any fasteners and/or the location of the fasteners that are present. In some embodiments, the scanner may comprise a laser scanner, such as a 2D laser scanner. For example, the 2D laser scanner may be oriented such that the scanner can scan for obstructions in planes underneath one or more portions of the document that have been lifted by the suction applicator.

A single document, with no fasteners thereon, would be lifted by the four suction applicators, thereby leaving no obstruction underneath the document. A document stack comprising a fastener thereon can comprise one or more obstructions in the planes underneath the first document. For example, some or all of the first document of the stack may be lifted by the suction applicators. Any portion of the first document which may droop due to the weight of the fastener and/or being attached to additional document(s) by the fastener can be detected by the scanner 706. For example, the scanner can detect that obstructions may exist in the planes underneath a plane of the first document lifted by the suction applicator, such as due to one or more portions of the first document drooping due to the weight of the fastener and/or other document(s) of the stack attached thereto, and/or obstructions from one or more portions of the other document(s) in the stack being lifted due the attachment by the fastener. Such a technique can enable accurate determination of the location of a fastener, such as in which quadrant the fastener is located, including fasteners which may be invisible to other types of analysis. In some embodiments, such a lift and scan technique may advantageously facilitate identification of fasteners such as adhesives which may not be visible from a top down surface analysis of the document or document stack. In some embodiments, the lift and scan technique can be used in combination with one or more other methods described herein. For example, the lift and scan technique can be used to accurately determine a location of the fastener such that a subsequent more robust fastener identification analysis can be used to focus on the identified location. In some embodiments, the lift and scan technique can be combined with one or more stereovision processes described herein. For example, a stereovision process may be used to focus analysis on a particular portion of a document stack identified by the lift and scan technique to determine the type and/or orientation of fastener.

Figure 9:
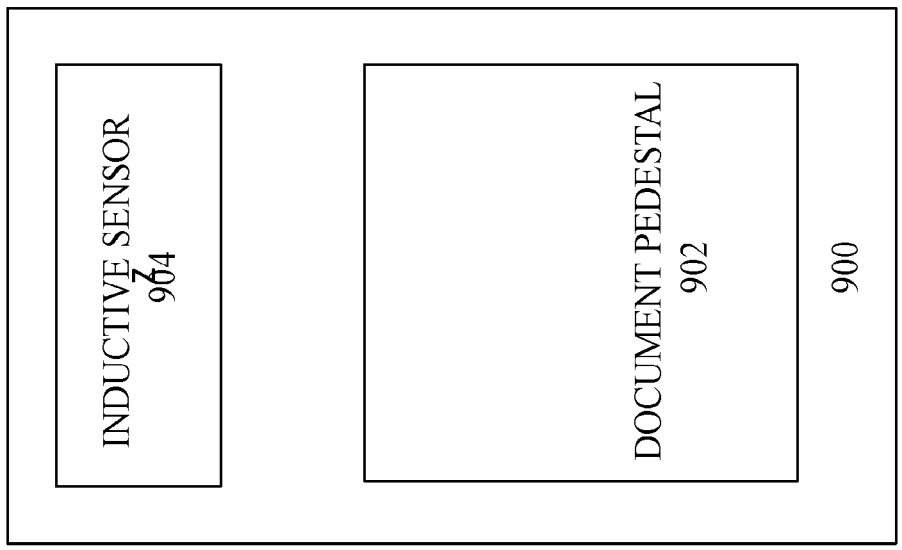
FIG. 9 is a schematic diagram of an example of an inductive sensing fastener identification system.

FIG. 9 is a schematic diagram of an inductive sensing fastener identification system 800. The inductive sensing fastener identification system can include a document pedestal 902 and an inductive sensor 904. The inductive sensor may comprise an array of inductive sensors. The inductive sensor can be configured to be brought into proximity of a document or document stack positioned on the pedestal. The inductive sensor and/or the document pedestal 902 may be moved such that the inductive sensor can be passed over the entire document or document stack to determine whether any fasteners are present. The inductive sensor 902 may be used to determine presence of any metallic fasteners on the document or document stack. In some embodiments, the inductive sensor can be used to provide an estimate of the location of the fasteners. For example, if a sensor in the array of inductive sensors is triggered to indicate presence of a fastener, the fastener can be approximated to a particular distance from the triggered sensor. In some embodiments, the fastener or portion of the fastener can be less than about 4 centimeters (cm) from the senor, including less than about 3 cm, about 2 cm or about 1 cm from the triggered sensor.

In some embodiments, the inductive sensing technique as described herein can be used in combination with one or more other methods described herein. For example, the inductive sensing technique can be used to approximate a location of the fastener such that a subsequent more robust fastener identification analysis can be used to focus on the identified location. In some embodiments, the inductive sensing technique can be combined with one or more stereovision processes described herein. For example, a stereovision process may be used to focus analysis on a particular portion of a document stack identified by the inductive sensing technique to determine the type and/or orientation of fastener.

In some embodiments, the fastener identification systems 700, 800 and 900 can include one or more other features as described herein, including for example one or more components configured to manipulate the document or document stack. In some embodiments, the fastener identification systems 700, 800 and 900 can comprise one or more document platforms, and/or robot arms, such as robot arms configured to be releasably coupled to one or more end effectors as described herein for the removal of fasteners.

One or more systems described herein may be used to fully automate a process for identification of single sheets of documents and/or fasteners. In some embodiments, one or more systems described herein can operate within a larger automated process, such as part of an assembly line in an automated warehouse used to digitize information stored on physical documents. For example, one or more systems described herein can form a robotic work cell or part of a robotic work cell. An assembly line for digitizing information stored on physical documents can comprise a plurality of robotic work cells. Such an assembly line can be installed to handle a large volume of documents. For example, an automated facility may be able to process thousands of boxes of documents a day. Automation of the document processing can improve efficiency, such as enabling an inventory queueing system for boxes of documents to be processed, as well as a storage for boxes that have been digitized but are awaiting quality assurance of the processed pages, for example prior to shredding. Such an automated facility may be desired for a large archive in which the unscanned backlog of boxes may represent years and years of scanning. Such a facility would enable rapid scanning of selected boxes on demand and returning the box to the archive for permanent archive.

Figure 10:
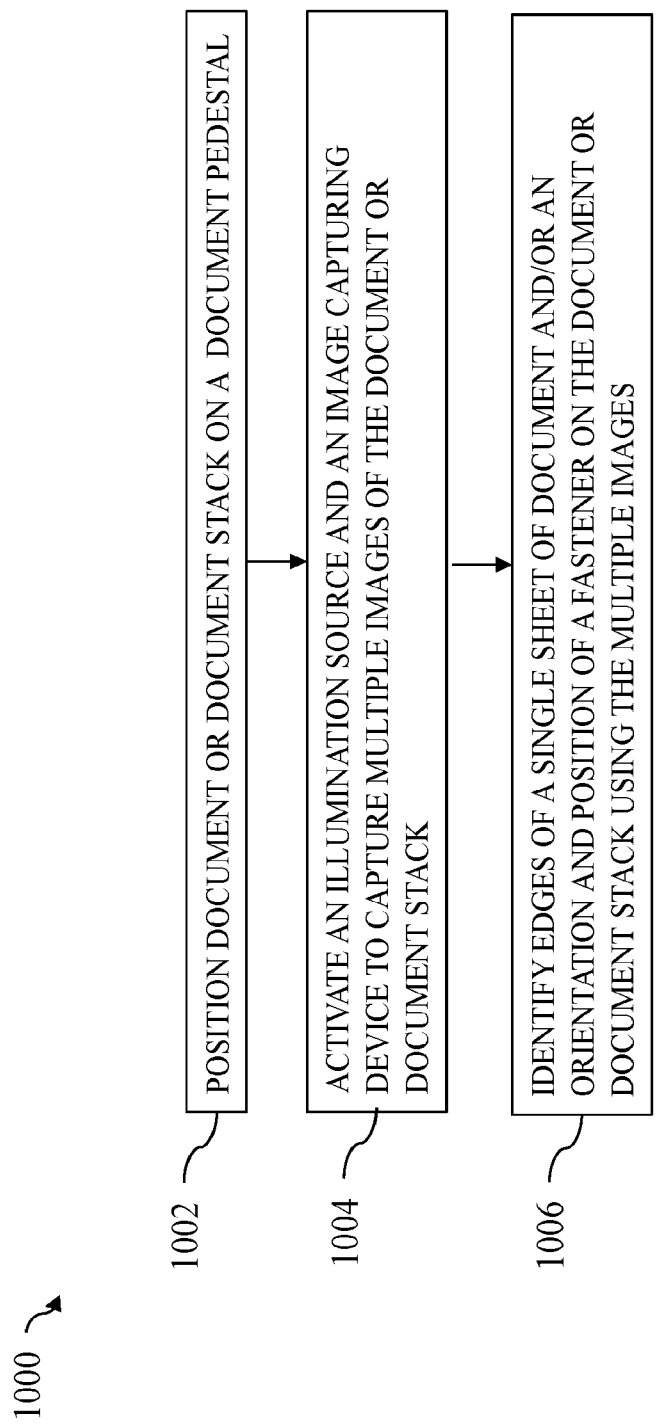
FIG. 10 is a process flow diagram of an example process for identifying a single sheet of document and/or a fastener.

FIG. 10 is an example of a document and fastener identification process 1000 for identifying a single sheet of document and/or one or more fasteners attached to a document or document stack. In some embodiments, the document and fastener identification process 1000 comprises a photometric stereovision technique. In some embodiments, at least a part of the process 1000 can be implemented using one or more document identification systems described herein, such as the document and fastener identification system 200 described with reference to FIG. 2. In block 1002, the document or document stack can be positioned on a pedestal of the document and fastener identification system. In block 1004, an illumination source and image capturing device of the document and identification system can be activated to capture multiple images of the document or document stack. The illumination source may comprise a plurality of illumination modules, each of the modules being configured to be individually illuminated sequentially. For example, the illumination source may comprise four illumination modules, each of the four illumination modules comprising a plurality of LEDs. The four illumination modules may be illuminated in sequence such that one or more images of the document stack can be captured by the imaging device when each of the illumination modules are illuminated. The four illumination modules can be located at different positions relative to the document or document stack to illuminate the document or document stack from different positions. Shadow profiles of any three-dimensional features on the document or document stack can be determined using images of the document or document stack illuminated from different positions.

In block 1006, images of the document stack are processed to identify edges of a single sheet of document and/or the orientation and position of any fastener present on the document or document stack. For example, shadow profiles obtained from the captured images of one or more edges of a single sheet of document and/or fasteners on the document or document stack can be used to identify the edges of a single sheet of document and/or the orientation and position of the fastener.

Figure 11:
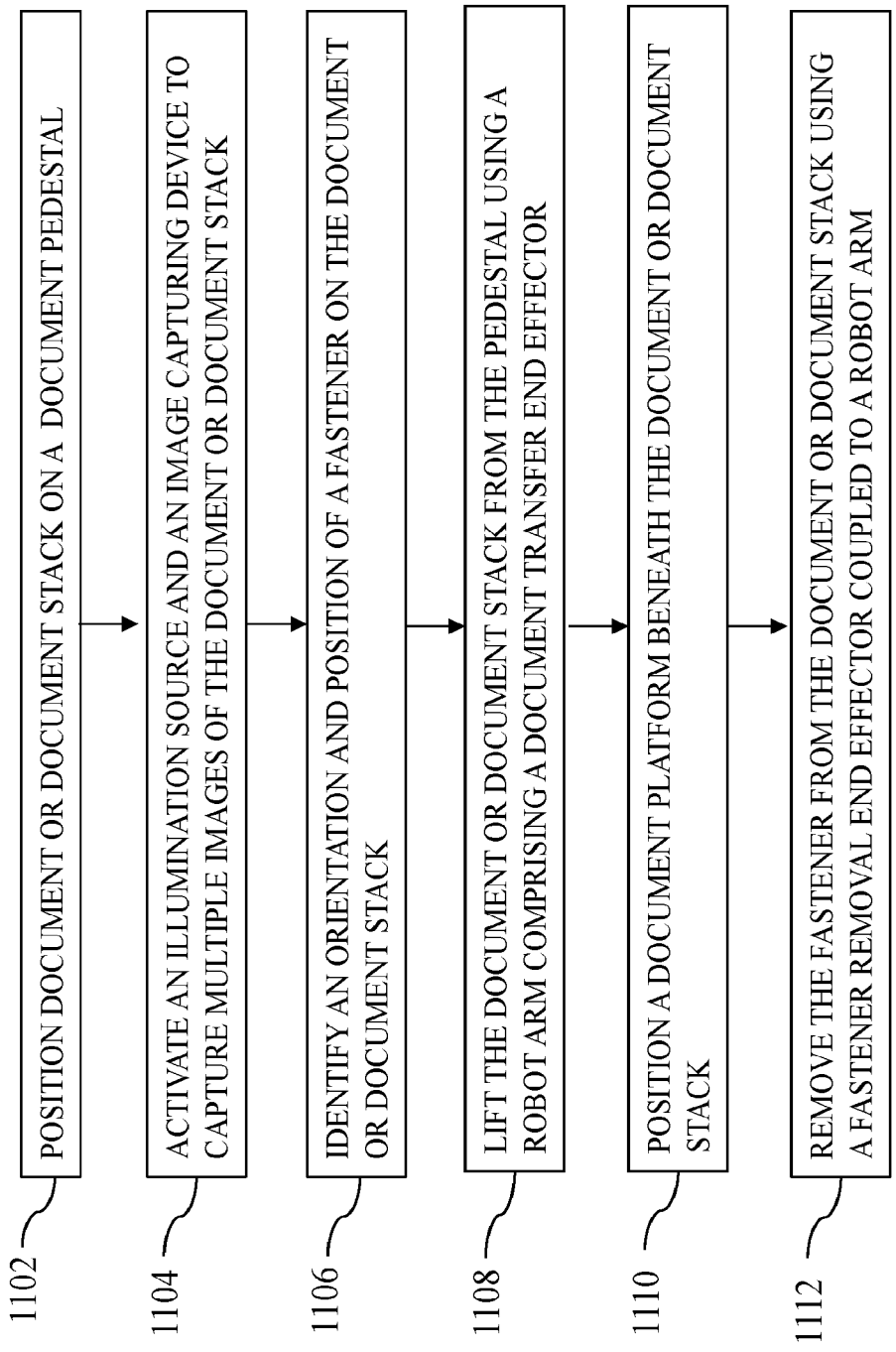
FIG. 11 is a process flow diagram of an example of a process for removing a fastener.

FIG. 11 is an example of a fastener removal process 1100 for removing a fastener attached to a document or document stack. For example, a staple attached to a document or document stack can be removed. The fastener removal process 1100 can be performed using one or more document and fastener identification systems described herein, including for example, the document and fastener identification system 200 described with reference to FIG. 2. In block 1102, the document or document stack can be positioned on a pedestal of the document and fastener identification system. In block 1104, an illumination source and image capturing device of the document and identification system can be activated to capture multiple images of the document or document stack. In block 1106, the orientation and position of the fastener on the document or document stack can be identified. For example, shadow profiles of one or more fasteners on the document or document stack obtained from the captured images can be used by the document and fastener identification system to determine the orientation and position of the fastener.

In block 1108, a robot arm comprising a document transfer end effector can be used to lift the document or document stack from the pedestal. Lifting the document or document stack can separate the document or document stack from any other document(s) or document(s) on the pedestal. In some embodiments, one or more document transfer end effectors as described herein may be used to pick up the document stack, including for example, the document transfer end effector 400 as described with reference to FIG. 4. The document transfer end effector can be positioned over the fastener using the robot arm. A suction applicator of the document transfer end effector can be brought into contact with the document or document stack and activated, such that a suction force can be exerted upon the document or document stack. The suction force can be used to maintain contact between the document or document stack and the suction applicator such that the document or document stack can be lifted from the pedestal. In some embodiments, the document transfer end effector comprises a document pincher configured to further facilitate lifting of the document or document stack. The document pincher can be activated such that a document gripper of the pincher can be brought into contact with the document or document stack to secure the document or document stack against a bottom surface of the end effector. For example, a document pincher can comprise a rotatable arm configured to bring the document gripper into contact with the document or document stack when the arm is rotated such that the document or document stack is pinned between the document gripper and a lower surface of the end effector.

In block 1110, a document platform can be positioned beneath the document or document stack. Positioning the document platform beneath the document or document stack can maintain separation of the document or document stack from any document(s) or document stack(s) on the pedestal.

In block 1112, a robot arm comprising a fastener removal end effector can be used to remove the fastener from the document or document stack. One or more fastener removal end effectors described herein can be used, including the fastener removal end effector 500 as described with reference to FIG. 5. For example, a pair of document contacting portions of the fastener removal end effector can be brought into contact with a top surface of the document or document stack. The document or document stack may be held in position against the document platform using the document contacting portions. In some embodiments, a fastener removal insert of the end effector can be inserted between a portion of the fastener and the top surface of the document or document stack. For example, a tab portion of fastener removal insert can be positioned between a crown portion of a staple and the top surface of the document or document stack. A fastener gripper of the end effector can subsequently be brought into contact with at least a portion of the fastener, such as at least a portion of the crown of a staple. The fastener gripper can be pressed against the portion of the fastener, such as the portion of the crown. The fastener gripper and the tab portion of the end effector can then be moved away from the document or document stack such that the staple can be pulled out.

In some embodiments, the fastener gripper and/or the tab portion can contact the entire or substantially the entire width of the crown portion of the staple, such that the staple can be reliably pulled out without breaking the staple.

Figure 12:
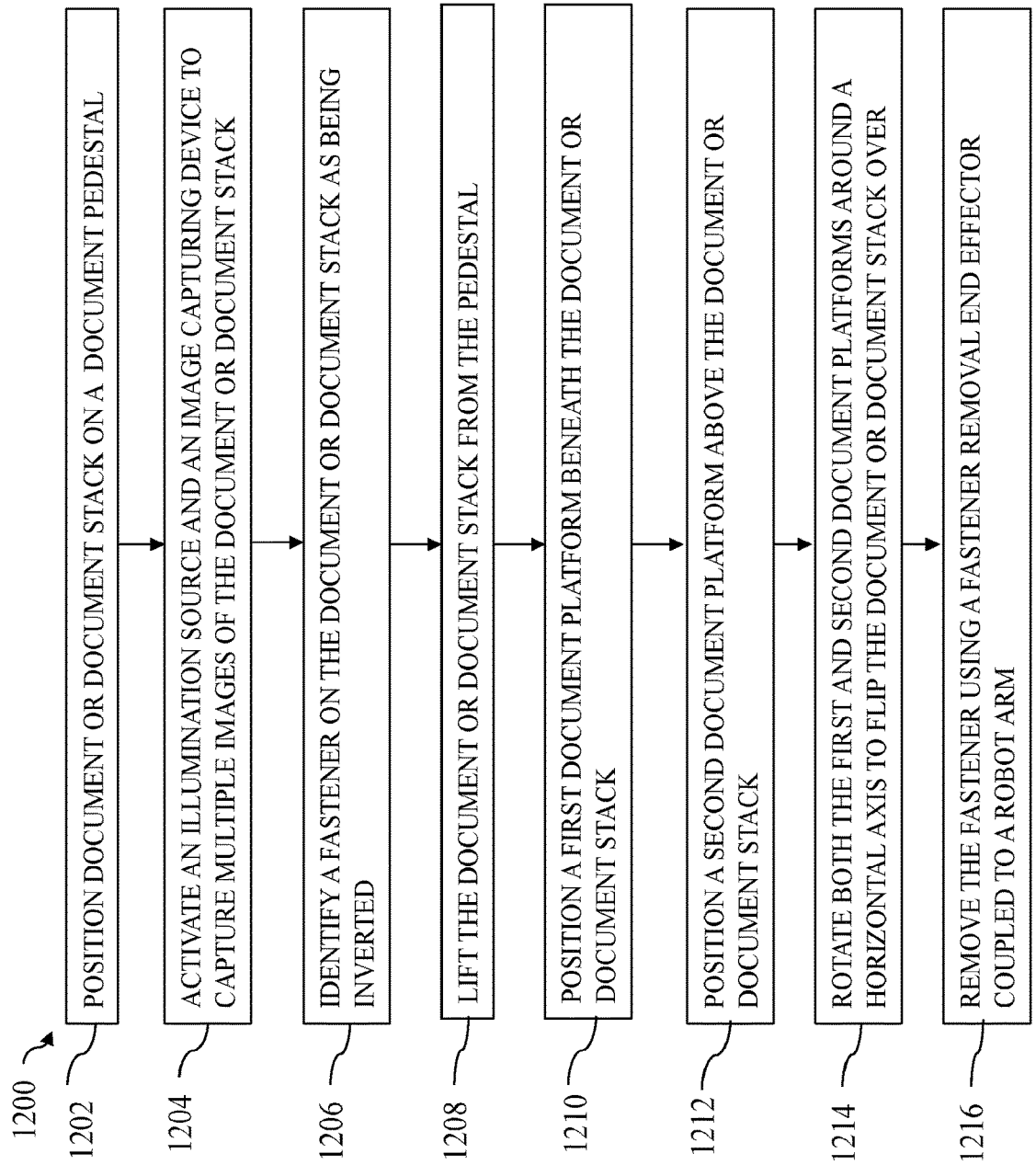
FIG. 12 is a process flow diagram of another example of a process for removing a fastener.

FIG. 12 is another example of a fastener removal process 1200. The fastener removal process 1100 can be performed using one or more document and fastener identification systems described herein, including for example, the document and fastener identification system 200 described with reference to FIG. 2. The fastener removal process 1200 can be used to remove an inverted fastener. For example, the process 1200 can be used to remove an inverted staple attached to a document or document stack, such as a staple having its two bent legs facing the illumination source of a document and fastener identification system rather than the crown portion extending between the two legs. In block 1202, the document or document stack can be positioned on a pedestal of the document and fastener identification system. In block 1204, an illumination source and image capturing device of the document and identification system can be activated to capture multiple images of the document or document stack. In block 1206, the fastener can be identified as being inverted using the captured images. In block 1208, the document or document stack can be lifted from the pedestal. Lifting the document or document stack can separate the document or document stack from any other document(s) or document stack(s) on the pedestal. In block 1210, a first document platform can be positioned beneath the document or document stack. Positioning the first document platform beneath the document or document stack can maintain separation between the document or document stack from the other document(s) and/or document stack(s) on the pedestal. For example, the document or document stack can be position on and in contact with the first document platform. In block 1212, a second document platform can be positioned over the document or document stack. The second platform can be in contact with the document or document stack such that the document or document stack is sandwiched between and in contact with the first document platform and second document platform.

In block 1214, the first document platform and the second document platform can be rotated around a horizontal axis such that the document or document stack therebetween is flipped over. Flipping the document or document stack over reorients the fasteners so that it is no longer inverted, thereby facilitating removal of the fastener. In block 1216, a robot arm coupled to a fastener removal end effector can be used to remove the fastener from the document or document stack. For example, a fastener removal end effector, such as the fastener removal end effector 500 described with reference to FIG. 5, can be used to remove the staple.

While some embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. Further, it is intended that methods and structures within the scope of the following claims and their equivalents be covered thereby.

What is claimed is:

1. A method of document processing, comprising:
   activating, in sequence, a plurality of illumination modules of an illumination source to illuminate a document, wherein the plurality of illumination modules are located at different positions relative to the document;
   imaging the document each time the document is illuminated by an illumination module of the plurality of illumination modules, to provide a plurality of images;
   obtaining a shadow profile of the document based on the plurality of images;
   identifying, with aid of at least one processor, at least one or more members selected from the group consisting of a boundary of the document and presence of a fastener attached to the document, using the shadow profile, wherein identifying the presence of the fastener comprises recognizing when the fastener is an inverted fastener; and
   when the fastener is the inverted fastener,
      applying a suction force upon a portion of the document using a suction applicator to lift the document from a document pedestal;
      positioning a first document platform under the lifted document;
      positioning a second document platform over the lifted document to place the document between and in contact with the first document platform and the second document platform; and
      rotating the first document platform and the second document platform around a horizontal axis to flip the document over.

2. The method of claim 1, wherein identifying the boundary of the document comprises identifying an edge having a thickness of less than 0.1 millimeters (mm).

3. A method of document processing, comprising:
   activating, in sequence, a plurality of illumination modules of an illumination source to illuminate a document, wherein the plurality of illumination modules are located at different positions relative to the document;
   imaging the document each time the document is illuminated by an illumination module of the plurality of illumination modules, to provide a plurality of images;
   obtaining a shadow profile of the document based on the plurality of images;
   identifying, with aid of at least one processor, at least one of a boundary of the document and presence of a fastener attached to the document using the shadow profile; and
   removing an identified fastener from the document, wherein the removing comprises:
      coupling a document transfer end effector to a robot arm;
      contacting a top surface of the document with the document transfer end effector coupled to the robot arm to apply a suction force upon the document to lift the document from a document pedestal on which the document is positioned to separate the document from other documents on the document pedestal;
      rotating a document pincher of the document transfer end effector to contact a bottom surface of the document to secure the document against the document transfer end effector;
      positioning a document platform under the lifted document to maintain separation of the document from the other documents;
      releasing the suction force applied upon the document by the document transfer end effector to place the document on the document platform; and
      releasing the document transfer end effector from the robot arm and coupling a fastener removal end effector to the robot arm.

4. The method of claim 1 or claim 3, wherein the document further comprises a staple attached thereto, and wherein identifying the at least one of the boundary of the document and presence of the fastener comprises identifying presence of the staple.

5. The method of claim 3, further comprising:
   contacting the top surface of the document with a document contacting portion of the fastener removal end effector to hold the document against the document platform;
   inserting a fastener removal tab of the fastener removal end effector between the fastener and the top surface of the document;
   gripping the fastener with a fastener gripper of the fastener removal end effector to position at least a portion of the fastener between the fastener insert tab and the fastener gripper; and
   moving the fastener gripper and the fastener removal tab away from the document to remove the fastener.

6. A method of document processing, comprising:
   activating, in sequence, a plurality of illumination modules of an illumination source to illuminate a document, wherein the plurality of illumination modules are located at different position relative to the document;
   imaging the document each time the document is illuminated by an illumination module of the plurality of illumination modules, to provide a plurality of images;
   obtaining a shadow profile of the document based on the plurality of images;
   identifying, with aid of at least one processor, at least one of a boundary of the document and presence of a fastener attached to the document using the shadow profile; and identifying a corresponding fastener removal end effector for a robot arm based on type information of the fastener attached to the document.

* * * * *